United States Patent
Funk et al.

(10) Patent No.: US 9,664,521 B2
(45) Date of Patent: May 30, 2017

(54) SYSTEM AND METHOD FOR LOCALIZING A TRACKEE AT A LOCATION AND MAPPING THE LOCATION USING SIGNAL-BASED FEATURES

(71) Applicant: TRX Systems, Inc., Greenbelt, MD (US)

(72) Inventors: Benjamin E. Funk, Hanover, MD (US); Jared Napora, Severn, MD (US); Kamiar Kordari, McLean, VA (US); Ruchika Verma, Bethesda, MD (US); Amrit Bandyopadhyay, Washington, DC (US); Carole Teolis, Glenn Dale, MD (US)

(73) Assignee: TRX Systems, Inc., Greenbelt, MD (US)

(*) Notice: Subject to any disclaimer, the term of this patent is extended or adjusted under 35 U.S.C. 154(b) by 0 days.

(21) Appl. No.: 14/262,627

(22) Filed: Apr. 25, 2014

(65) Prior Publication Data

US 2015/0285638 A1 Oct. 8, 2015

Related U.S. Application Data

(62) Division of application No. 13/852,649, filed on Mar. 28, 2013, now Pat. No. 8,751,151.
(Continued)

(51) Int. Cl.
*G01C 21/12* (2006.01)
*G06T 15/00* (2011.01)
(Continued)

(52) U.S. Cl.
CPC .......... *G01C 21/206* (2013.01); *G01C 21/00* (2013.01); *G01C 21/165* (2013.01); *G01S 19/13* (2013.01); *G01S 19/39* (2013.01)

(58) Field of Classification Search
USPC .................................. 701/409–540; 345/419
See application file for complete search history.

(56) References Cited

U.S. PATENT DOCUMENTS

| 7,106,189 B2 | 9/2006 | Burneske et al. |
| 7,304,571 B2 | 12/2007 | Halsey et al. |

(Continued)

FOREIGN PATENT DOCUMENTS

| WO | WO 2009/021068 A1 | 2/2009 |
| WO | WO 2011/097018 A1 | 8/2011 |

OTHER PUBLICATIONS

U.S. Appl. No. 14/262,618, filed Apr. 25, 2014, Funk et al.
European Patent Application No. 13803670.2; Extended Search Report; dated Jan. 25, 2016; 7 pages.

*Primary Examiner* — Tyler Paige
(74) *Attorney, Agent, or Firm* — Baker & Hostetler LLP

(57) ABSTRACT

A system and method for recognizing features for location correction in Simultaneous Localization And Mapping operations, thus facilitating longer duration navigation, is provided. The system may detect features from magnetic, inertial, GPS, light sensors, and/or other sensors that can be associated with a location and recognized when revisited. Feature detection may be implemented on a generally portable tracking system, which may facilitate the use of higher sample rate data for more precise localization of features, improved tracking when network communications are unavailable, and improved ability of the tracking system to act as a smart standalone positioning system to provide rich input to higher level navigation algorithms/systems. The system may detect a transition from structured (such as indoors, in caves, etc.) to unstructured (such as outdoor) environments and from pedestrian motion to travel in a vehicle. The system may include an integrated self-tracking unit that can localize and self-correct such localizations.

22 Claims, 26 Drawing Sheets

Related U.S. Application Data

(60) Provisional application No. 61/799,659, filed on Mar. 15, 2013, provisional application No. 61/658,697, filed on Jun. 12, 2012.

(51) Int. Cl.
*G01C 21/20* (2006.01)
*G01C 21/16* (2006.01)
*G01C 21/00* (2006.01)
*G01S 19/13* (2010.01)
*G01S 19/39* (2010.01)

(56) References Cited

U.S. PATENT DOCUMENTS

| | | | | |
|---|---|---|---|---|
| 8,521,418 | B2* | 8/2013 | Ma | G01S 17/89 340/435 |
| 8,688,375 | B2* | 4/2014 | Funk | G01C 21/165 340/995.19 |
| 8,712,686 | B2* | 4/2014 | Bandyopadhyay | G01C 17/38 701/445 |
| 8,751,151 | B2* | 6/2014 | Funk | G01C 21/206 340/539.13 |
| 2004/0021569 | A1* | 2/2004 | Lepkofker | G01C 21/206 340/568.1 |
| 2005/0242947 | A1 | 11/2005 | Burneske et al. | |
| 2008/0033645 | A1 | 2/2008 | Levinson et al. | |
| 2008/0077326 | A1* | 3/2008 | Funk | G01C 21/165 701/500 |
| 2009/0019402 | A1* | 1/2009 | Ke | G06K 9/2081 715/849 |
| 2009/0043504 | A1* | 2/2009 | Bandyopadhyay | G01C 17/38 701/469 |
| 2009/0060085 | A1 | 3/2009 | Nadler et al. | |
| 2009/0102707 | A1* | 4/2009 | Elwell, Jr. | G01C 21/206 342/357.52 |
| 2009/0248304 | A1 | 10/2009 | Roumeliotis et al. | |
| 2009/0262974 | A1 | 10/2009 | Lithopoulos | |
| 2009/0321094 | A1 | 12/2009 | Thomas | |
| 2011/0080848 | A1 | 4/2011 | Khorashadi et al. | |
| 2011/0098921 | A1 | 4/2011 | Miller et al. | |
| 2011/0153136 | A1* | 6/2011 | Anderson | G05D 1/0219 701/25 |
| 2011/0204895 | A1 | 8/2011 | Zeller et al. | |
| 2011/0212717 | A1* | 9/2011 | Rhoads | G06F 17/30241 455/420 |
| 2011/0282622 | A1* | 11/2011 | Canter | G06K 9/00691 702/150 |
| 2011/0320123 | A1* | 12/2011 | Choi | G01S 5/0284 701/300 |
| 2012/0072052 | A1* | 3/2012 | Powers | G05D 1/0044 701/2 |
| 2012/0093408 | A1* | 4/2012 | Tang | G06K 9/4642 382/171 |
| 2012/0143495 | A1* | 6/2012 | Dantu | G01C 21/206 701/428 |
| 2012/0235865 | A1 | 9/2012 | Nath et al. | |
| 2012/0259544 | A1* | 10/2012 | Watson | G01C 21/16 701/500 |
| 2012/0306847 | A1* | 12/2012 | Lim | G06K 9/00744 345/418 |
| 2012/0306850 | A1* | 12/2012 | Balan | G06T 19/006 345/419 |
| 2013/0024117 | A1* | 1/2013 | Pavetti | G01C 22/006 701/538 |
| 2013/0096817 | A1* | 4/2013 | Fauci | H04W 4/043 701/411 |
| 2013/0131985 | A1 | 5/2013 | Weiland et al. | |
| 2013/0321391 | A1* | 12/2013 | Troy | G06T 15/00 345/419 |

* cited by examiner

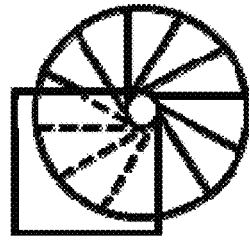
Radial Stairwell
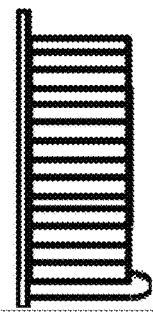
Straight Stairwell
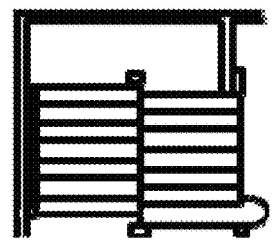
U-Shape Stairwell
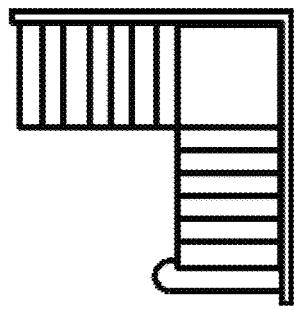
L-Shape Stairwell
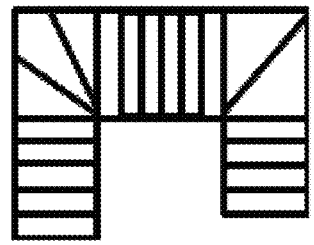
Winder Stairwell
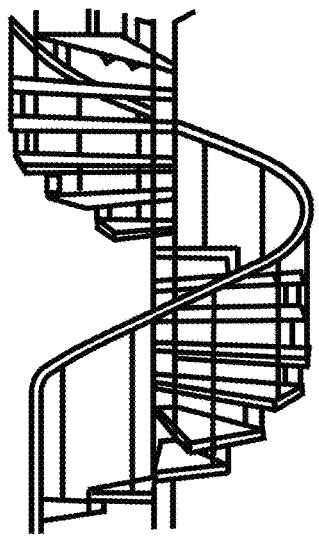
Counterclockwise Up
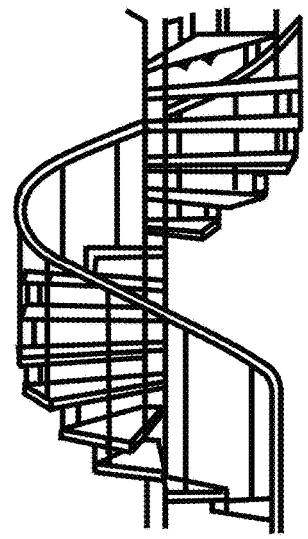
Clockwise Up
FIG. 10

SYSTEM AND METHOD FOR LOCALIZING A TRACKEE AT A LOCATION AND MAPPING THE LOCATION USING SIGNAL-BASED FEATURES

CROSS REFERENCE TO RELATED APPLICATIONS

This application is a divisional of U.S. patent application Ser. No. 13/852,649 filed on Mar. 28, 2013, which claims benefit under 35 U.S.C. §119(e) of Provisional U.S. Provisional Patent Application No. 61/799,659, filed Mar. 15, 2013, and U.S. Provisional Patent Application No. 61/658,697, filed Jun. 12, 2012, the entire contents of each of which are incorporated herein by reference in their entirety

GOVERNMENT RIGHTS

This invention was made with government support under W31P4Q-10-C-0166, awarded by the Defense Advanced Research Projects Agency. The Government has certain rights in the invention.

TECHNICAL FIELD

The invention relates to systems, computer program products, and methods for both localizing a trackee at a location and mapping the location using sensor information obtained from inertial sensors.

BACKGROUND

Generally speaking, a goal of localization and mapping is to compute the most probable location of a trackee using prior sensor and control values (if available). Simultaneous Localization And Mapping ("SLAM") is a particular localization and mapping technique that uses allothetic sensors, such as image sensors that provide external information about the environment, and idiothetic sensors, which provide information related to the subject's motion in body reference frame, to construct a geometric or topological model of the environment and uses the model for navigation.

Allothetic information may also be used to aid in construction of metric and feature maps. For example, cues such as image features, sonar time-of-flight, color, and/or other external information about the environment may be used to directly recognize a place or situation. Allothetic information may also be used to derive subject motion from measurements of the environment by converting information expressed in the space related to the idiothetic data based on metric models of the associated sensors. With such a metric model, it is possible to infer the relative positions of two places in which allothetic information has been gathered. For example, frame-to-frame stereo camera feature tracking can be used to solve for 6-Degrees Of Freedom ("DOF") motion of the camera.

Idiothetic information may include speed, acceleration, wheel rotation for vehicles, and/or other information that provides information related to the subject's motion in body reference frame. Dead reckoning operations may use idiothetic information to provide position estimates of the subject in a metric space. Inertial and pressure sensors, which are typically viewed as idiothetic sensors, have been used to provide local allothetic map reference data by inferring the location of terrain features based on how the subject moves through the environment. Inertial and pressure sensors have been effectively used to locate features in structured environments such as stairways and elevators in buildings, which may be used for path corrections.

The limitations and advantages of allothetic and idiothetic sources of information are complementary. One problem associated with the derived metric motion information is that, because it involves a dead reckoning process, it is subject to cumulative error. This may lead to a continuous decrease in quality; therefore, such information may not be trusted over long periods of time. On the other hand, the quality of feature based map information is stationary over time, but suffers from the perceptual aliasing problem. For example, in a given sensor system, two distinct landmarks such as doors or light fixtures in the environment may appear to be the same landmark.

In order to build reliable maps and to navigate for long periods of time, the user track and map information may be combined. In other words, map information may be used to compensate for information drift while user motion/track information may allow perceptually aliased allothetic information to be disambiguated. Techniques have been developed to integrate both allothetic and idiothetic sources of information into a representation useful for navigation. Conventionally, the corresponding representations are referred to as metric maps or topological maps.

In a conventional SLAM problem, the trajectory of the observer—positions, velocities, and headings (etc.)—together with estimates of the map are estimated online without a priori knowledge of a location. Typically, however, navigation and mapping systems may have access to pre-existing map data, which can include, for example, satellite or other aerial imagery, Geographic Information Systems ("GIS") shape files (including building outlines, roads), elevation maps, and building maps (Computer Assisted Design ("CAD") files, floor plans, etc.). What is needed is an ability to integrate this existing map information to provide a priori knowledge of a location for navigation and/or modification or extension of SLAM algorithms as new features are discovered.

The SLAM problem has been formulated and solved as a theoretical problem in a number of different forms. However, issues remain in realizing general SLAM solutions in practice and notably in building and using perceptually rich maps as part of a SLAM algorithm. The most common representation is in the form of a state-space model with additive Gaussian noise, leading to the use of the extended Kalman filter (EKF) to solve the SLAM problem.

The EKF provides a recursive solution to the navigation problem and a way to compute consistent estimates for the uncertainty in subject and map landmark locations. This is despite the fact that many sensor noise models are not well represented by additive Gaussian noise.

An important alternative to Kalman Filtering methods is the use of particle filters. Particle filters are a class of nonlinear filters that impose no restriction on the system model, measurement model or nature of the noise statistics. Particle filters compute a solution based on sequential Monte Carlo simulations of particles that are selected to represent the posterior distributions. Particle filters are optimal if given infinite computational resources, but even with limited resources, they can give a better solution than the EKF in cases where the operational region is highly nonlinear. FastSLAM, with its basis in recursive Monte Carlo sampling, or particle filtering, was the first method to directly represent the nonlinear process model and non-Gaussian pose distribution.

Recently, cell phone manufacturers have added navigation sensors to complement Global Positioning System ("GPS") receivers. These sensors, including triaxial accelerometers, triaxial gyroscopes, triaxial magnetic sensors, barometric pressure sensors, and/or other sensors may be used to track a subject indoors and at other GPS denied environments. Although conventional cell phone applications include the ability to enhance location using cell carrier location services (such as cell tower triangulation) and Wi-Fi (for example, provided by SKYHOOK and now APPLE, GOOGLE, and others), the location accuracy provided by these applications is not adequate. Thus, what is further needed is an ability to leverage the data provided from the embedded sensors to improve location accuracy for subjects in GPS denied or degraded areas, or other areas in which conventional location techniques are deficient.

However, the data provided by the embedded sensors are typically not the same quality as traditional navigation sensors. For example, Micro-Electrical-Mechanical System ("MEMS") sensors are subject to large inertial drift and other errors that should be accounted for in the design and operation of MEMS-based navigation algorithms.

As such, what is further needed is an ability to perform error reduction to allow reasonable duration of tracking in GPS denied or degraded areas or other areas in which conventional location techniques are deficient. These and other drawbacks exist.

SUMMARY

The invention addressing these and other drawbacks relates to systems, computer program products, and methods for both localizing a trackee at a location and mapping the location using sensor information obtained from inertial sensors. The system may include an integrated smart tracking unit that can localize and self-correct such localizations. The smart tracking unit may generate feature messages that may be used by other smart tracking units or other systems for localizations and mapping.

Other types of sensors such as magnetic sensors, Global Positioning System ("GPS") sensors, optical sensors (e.g., machine vision sensors), light sensors, and/or other sensors may be used to augment the sensor information obtained from the inertial sensors in order to localize the trackee at the location and map the location. Whether using inertial sensors alone or in combination with other types of sensors, the system may localize a trackee and, in doing so, recognize sensor features that correlate to landmarks such as structural or other features of the location. Recognized landmarks may be added to or otherwise used to generate a map of the location, thereby improving or creating a map of the location while also localizing the trackee. When the landmark is revisited (and re-recognized), the location of the structural feature may be used to adjust a location estimate of a trackee, thereby improving the location estimate using structural features that are recognized based on the inertial sensor information.

According to an aspect of the invention, the system may include a tracking system that includes one or more inertial sensors, other types of sensors, a communication sensor module, and/or other components. One or more components of the tracking system may be carried, worn, or otherwise associated with a trackee. The communication sensor module may communicate the sensor information to other tracking systems and/or a remote device such as a command center computer. The command center computer may therefore receive sensor information from one or more tracking systems and localize the trackee in a location while mapping the location using the inertial sensor information.

A portable computing device such as a smartphone may be configured to perform one or more functions of a tracking system, leveraging built-in or add-on inertial and other types of sensors of the portable computing device. The portable computing device may include one or more processors programmed with a mapping application, which implements SLAM (or other) algorithms. In this configuration, the tracking system may perform at least some of the localization and mapping functions locally at the portable computing device and/or may communicate the sensor information to remote computers for processing. Thus, localization and mapping functions based on inertial sensor information may partially or fully occur at the portable computing device and/or the command center computer, which may also be programmed with the mapping application.

The mapping application may localize the trackee using various techniques such as dead reckoning based on the inertial sensor information, recognize sensor features that correlate with landmarks, and update or generate a map of the location based on the landmarks. The mapping application may identify landmarks based on individually identifiable sensor features based on the inertial sensor information and/or inferred environmental structure. For example, the sensor features that correlate to landmarks may be individually identifiable based on a particular structure (e.g., a building, natural structure, etc.), shape of the structure (e.g., floor plan, footprint, interior of a cave, etc.), signals (e.g., magnetic and Received Signal Strength ("RSS") signals) processed in relation to the location, and/or other characteristics of the location.

By recognizing the sensor features when revisited, the mapping application may use the sensor features for location correction when implementing SLAM (or other) algorithms, thus enabling longer duration navigation within a location and mapping of the location. The identified sensor features when revisited may be fed back into a location estimate determined during the revisit and the corrected location estimate may be fed back into the map for refining the corresponding location of the landmark on the map.

According to an aspect of the invention, the mapping application may augment or supplement the inertial sensor information for input to the SLAM algorithms using other sensor information such as magnetic sensor information, GPS information, light sensor information, and/or other sensor information. The other sensor information may be used to identify sensor features that correspond to landmarks. Thus, different types of sensors may be used to identify sensor features that together may identify the same or different landmarks.

The mapping application may also use previously known mapping information and/or other information obtained in relation to the location that is being mapped and at which a trackee is being located. The previously known mapping information may be used to further refine the location estimate and the corrected location estimate may be used to refine the previously known mapping information.

According to an aspect of the invention, the mapping application may use sensor information from various sensors to identify transitions such as location transitions that indicate a trackee has moved from one location having certain characteristics to another location having different characteristics (such as inside a structure to outside a structure and vice versa) and speed transitions that indicate a trackee has moved from a slower speed such as walking to a faster speed such as being transported in a vehicle (and vice versa). The mapping application may adjust its processing based on the detected transitions. For example, the mapping application may use algorithms suited for when the trackee is outside of a structure and different algorithms suited for when the trackee is inside of the structure. Likewise, the mapping application may use different processing operations depending on whether the trackee is walking or riding in a vehicle. For example, the mapping application may switch to GPS-based localization when the trackee has transitioned from travelling on foot to riding in a vehicle.

The mapping application may also use location transitions to identify a landmark. For example, a location transition may indicate an entrance/exit to a structure being mapped and at which a trackee is localized. Thus, according to an aspect of the invention, a location transition may be identified as a sensor feature that is associated with a landmark.

According to an aspect of the invention, the detected sensor features may be reported as a feature message that includes individually identifiable feature information along with time/location, which can be associated to a path location (and which can be updated with the path as the path is corrected). The detected sensor features can be recognized when revisited and used for location correction, thus facilitating longer duration navigation.

According to an aspect of the invention, the tracking system may provide feature messages that have been implemented in a way that mirror the type of identifying information that would be provided from other types of smart sensors as input to SLAM algorithms. The feature messages may be obtained by the mapping application for implementing SLAM algorithms.

Similar to a stereo optical sensor that provides Speeded Up Robust Features ("SURF") descriptors with range information for each selected feature detected in an optical frame, the tracking system may provide features messages describing building-based features, shape-based features and signal-based features (e.g., features based on magnetic, RSS, etc., signals) for input to the mapping application implementing SLAM algorithms. For example, inertial sensors may be used to infer the location of a hallway. A hallway feature may be described with parameters such as feature ID#, navigation unit ID#, average heading, start location, end location, start time, end time (allowing association to the path location), and/or other parameters. These types of descriptors may be generated for features including exit/entrances, stairwells, halls, elevators, RSS waypoints, magnetic anomalies, and/or other features.

According to an aspect of the invention, each of the feature detection and transition techniques described herein may be run on other hardware that provides sensor information for the mapping application. According to an aspect of the invention, the mapping application, feature detection, transition detection, and/or other information described herein may be used to improve navigation using cell phones or other devices that include or otherwise have access to information from various sensors described herein.

The system may be adapted to locate, track, and/or monitor the status of personnel and/or assets in various indoor and outdoor locations or environments, in any number of various scenarios or applications, without limitation. For example, the features and functionality of the invention as described herein may be used to locate, track, and/or monitor the status of emergency personnel or first responders (e.g., fire-fighters, police, emergency services technicians, etc.) during an emergency incident (e.g., a building fire), people having VIP status (e.g., heads of state, dignitaries, celebrities, etc.) at a particular event, individuals (or assets) on University and/or corporate campuses, senior citizens at an assisted living center, and military and paramilitary personnel and/or law enforcement officials in various environments during any number of scenarios. The invention may be configured for additional applications as well. Accordingly, it should be understood that any descriptions provided herein of particular personnel and/or assets in particular locations or environments (e.g., firefighters or first responders fighting a building fire from locations both inside and outside of a building) are exemplary in nature only, and should not be viewed as limiting.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 10 is an exemplary illustration of various stairway configurations, according to an aspect of the invention.

DETAILED DESCRIPTION OF ILLUSTRATIVE EMBODIMENT

The invention described herein is directed to systems, computer program products, and methods for both localizing a trackee at a location and mapping the location using sensor information obtained from inertial sensors. By way of background, "personnel," as used herein, may refer broadly (and without limitation) to living entities (e.g., people, animals, etc.), while "assets" may refer broadly (and without limitation) to objects including, for example, those being moved or controlled by personnel as well as autonomous objects such as robots. A person (or other example of personnel) and an asset may also each be referred to herein more broadly as a "subject," a "trackee," a "target," "a user" or another similar descriptor. In some instances, the mapping application may be referred to interchangeably herein as "mapping software" or "mapping technology."

Exemplary System Architecture

Figure 1:
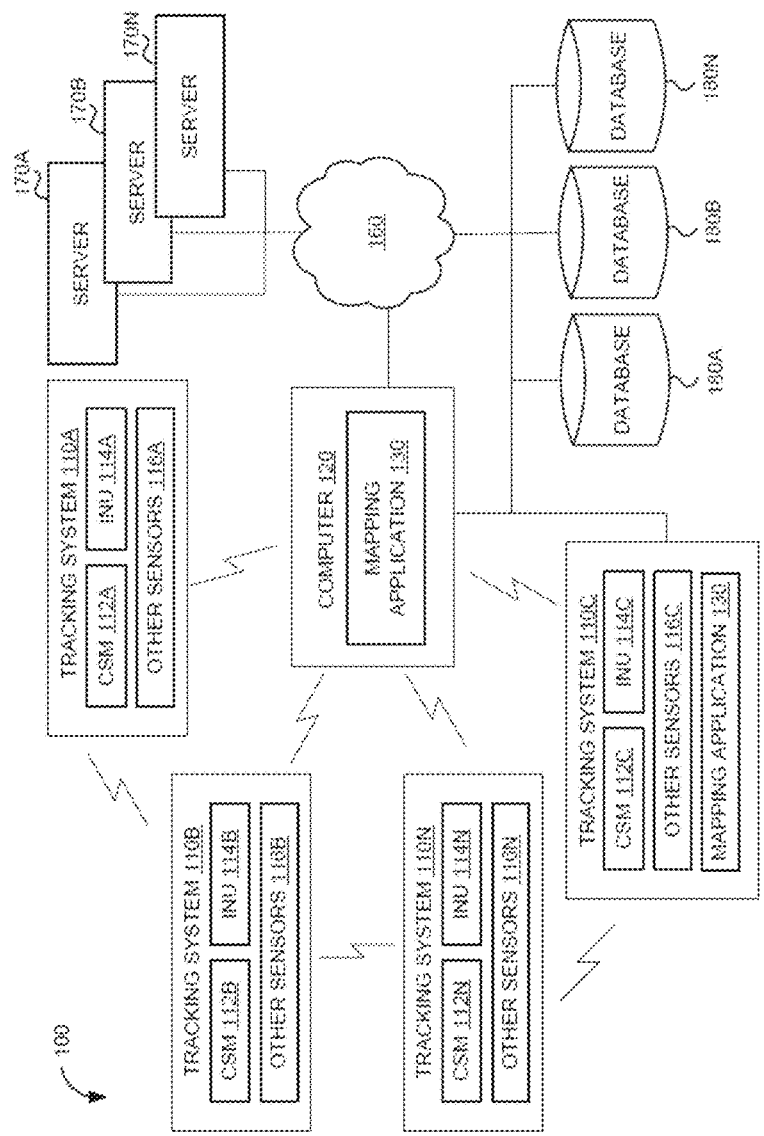
FIG. 1 depicts an exemplary system architecture, according to an aspect of the invention.

FIG. 1 depicts an exemplary architecture for a system 100, according to an aspect of the invention. System 100 may include one or more tracking systems 110 (illustrated in FIG. 1 as tracking systems 110A, 110B, 110C, . . . 110N), a computer 120, one or more servers 170 (illustrated in FIG. 1 as servers 170A, 170B, . . . , 170N), one or more databases 180 (illustrated in FIG. 1 as databases 180A, 180B, . . . , 180N), and/or other components.

Figure 2:
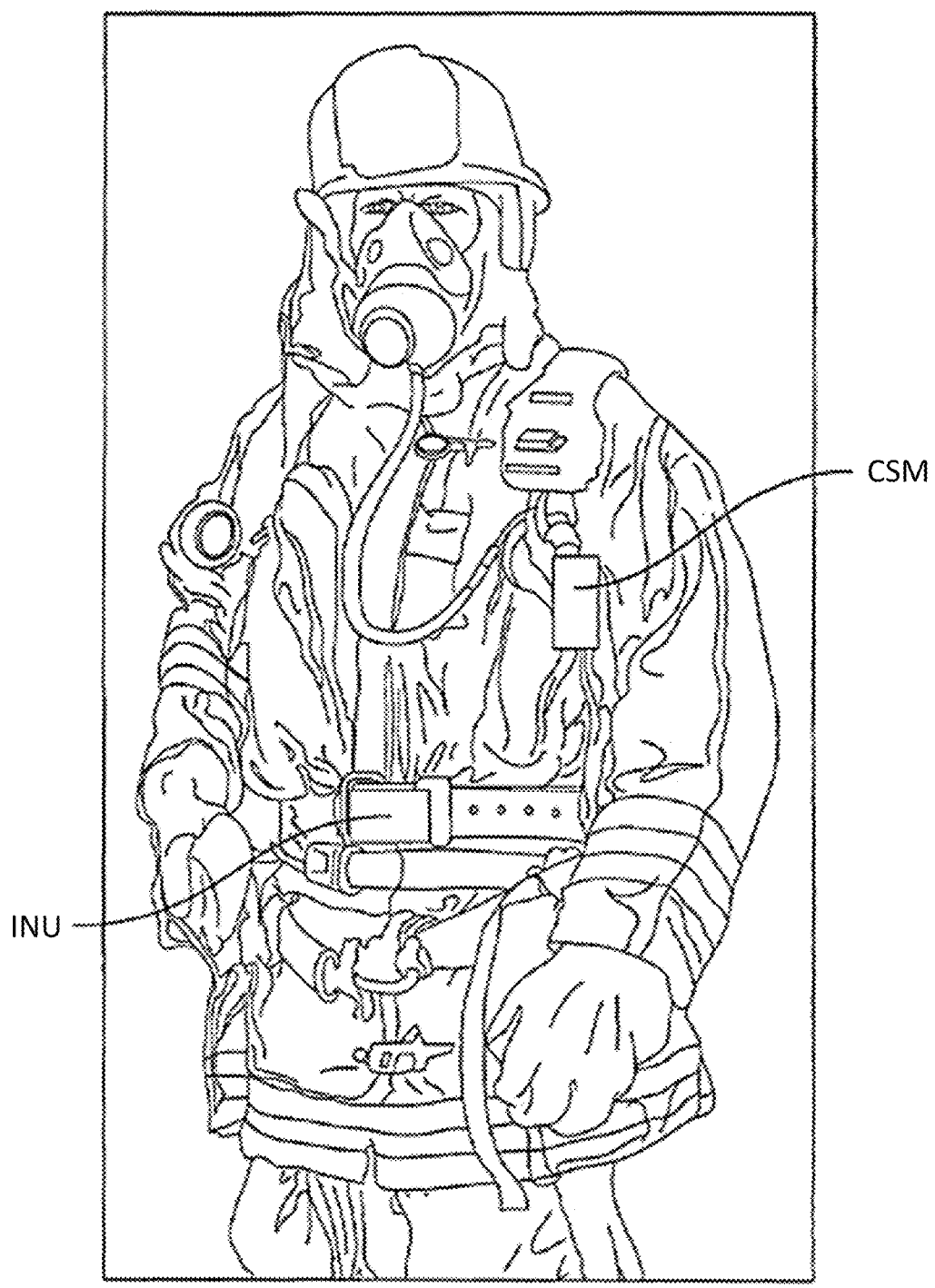
FIG. 2 is an exemplary illustration of a firefighter outfitted with components of a tracking system, according to an aspect of the invention.

Each tracking system 110 may comprise, for example, an Inertial Navigation Unit (INU) 114 (illustrated in FIG. 1 as INU 114A, 114B, 114C, . . . , 114N), a Communications Sensor Module (CSM) 112 (illustrated in FIG. 1 as CSM 112A, 112B, 112C, . . . , 112N), other sensors or devices 116 (illustrated in FIG. 1 as other sensors 116N, 116B, 116C, . . . , 116N), and/or other components. The other sensors or devices 116 may acquire physiological data (e.g., heart rate, respiration rate, etc.) from a user, environmental information (e.g., temperature, atmospheric pressure, background radiation, etc.), and/or other information. One or more components of a tracking system 110 may be provided to a trackee that is to be localized at a location. For example, FIG. 2 is an exemplary illustration of a firefighter outfitted with an INU 114 and a CSM 112.

INU 114 may comprise a generally portable device that may be worn by a user, and may include inertial navigation sensors and signal processing components to determine the location, motion and orientation of the user.

According to an aspect of the invention, INU 114 may use inertial sensors and magnetic or electro-magnetic field sensors to generate data that can be used to determine location, motion and orientation of a trackee. This may be accomplished by combining a variety of motion sensing components with a microprocessor or microcontroller which provides both I/O support for the peripheral sensors and computational capabilities for signal processing functions.

According to an aspect of the invention, motion detecting microelectronic sensors can be utilized, which may include MEMS technology. INU 114 may include a combination of digital or analog accelerometers, gyroscopes, and magnetic field sensors. In one configuration, for example, INU 114 may include a MEMS three-axis accelerometer, a one and two axis MEMS gyroscope, and a MEMS 3-axis magnetic field sensor. Other configurations may be implemented.

According to an aspect of the invention, one or more tracking algorithms may be implemented on INU 114 by way of a signal processing microcontroller. The one or more programmed tracking algorithms running on the microcontroller of the INU 114 may receive sensor information as input, and output x, y, and z location coordinates of the personnel or asset being tracked relative to its environment. "Location estimates," "position estimates," and "tracking estimates" may be used interchangeably herein.

CSM 112 may comprise a generally portable device carried by the user and may be in wired or wireless communication with INU 114 (and/or other physiological and environmental sensors or devices 116) to receive sensor information. According to an aspect of the invention, for instance, INU 114 may communicate with CSM 112 using a Bluetooth, Zigbee, or other wireless transceiver obviating the need for wires. INU 114 and CSM 112 may establish a wireless personal area network (WPAN) on each trackee, allowing for the addition of other distributed wireless sensors on the trackee as needed. According to an aspect of the invention, CSM 112 may include a radio transceiver for communicating the data wirelessly to one or more computing devices such as, for example, a computer 120 which may serve as a "base station" or "command center" at the particular location or environment. INU 114, CSM 112, and/or other components comprising a given tracking system may each be powered (individually or collectively) by one or more batteries (or other power source(s)).

According to an aspect of the invention, CSM 112 may perform the task of data aggregation from the various sensors "on-board" the trackee. CSM 112 may, for example, compile sensor information into a report which may be transmitted to computer 120 in a predetermined format either at predetermined intervals, on request, or at another time. CSM 112 may also include a panic button (or control) to enable a trackee to communicate distress to computer 120, along with one or more general purpose controls (or buttons) whose status may be communicated to computer 120 for processing.

According to an aspect of the invention, performing signal processing of the sensor information at INU 114 obviates the need to stream data to computer 120. In operation, only a relatively small amount of data may be sent by INU 114 to the CSM 112, and by CSM 112 to computer 120. Reducing the amount of data sent to computer 120 may reduce the probability of wireless transmission errors, and extend the range of communication between CSM 112 and computer 120 to greater distances such as, for example, several miles. In addition, this feature also provides for reliable communication of data from deep within the confines of multi-story buildings and structures of the type that are found in urban and university campus environments.

According to an aspect of the invention, one or more of the components of tracking system 110 may be integrated into a single unit (e.g., in a single housing) or may be housed in separate housings.

According to an aspect of the invention, a tracking system 110 may be configured as a self-contained unit such as a "smartphone" or other mobile device (illustrated in FIG. 1 as tracking system 110C) leveraging various built-in sensors such as a gyroscope and an accelerometer that may already be present in the smartphone. Tracking system 110C may process the sensor information described herein in real-time (e.g., as the sensor information is obtained), store the sensor information for later processing, and/or communicate the data to a remote device (such as another computer 120 and/or server 170) for processing at the remote device. Tracking system 110C may include one or more or all modules of mapping application 130, which is described below. As such, tracking system 110C may be configured as a smart tracking unit that can perform localizations and self-correction of localizations using features that can also be used to generate maps. Tracking system 110C so configured may also provide features messages (as described herein) that other tracking systems and/or other devices may use for localization and mapping. Although not illustrated in FIG. 1, other tracking systems 110 may also include one or more or all modules of mapping application 130.

According to an aspect of the invention, computer 120 may comprise a general purpose computer programmed with mapping application 130 (and/or other software) that enables the various features and functions of the invention, as described in greater detail below. According to an aspect of the invention, computer 120 may comprise a portable (e.g., laptop) computer which may serve as a "base station" or "command center" providing for the monitoring and management of personnel and assets (and information associated therewith) at a particular location or environment. Computer 120 may also comprise a cell phone, smart phone, PDA, pocket PC, or other device, and may be included within the WPAN described above. Computer 120 may also be incorporated into one or more of the components (e.g., the INU) of a tracking system.

According to an aspect of the invention, computer 120 may be connected to a radio transceiver to enable a supervisory user, an administrator, or other user to receive data from personnel and assets via the CSMs of their respective tracking systems, and to transmit individual or broadcast messages to personnel (and assets) such as warnings (e.g., to evacuate an area). According to one implementation, data may be received via a wireless network at computer 120 using any of a variety of network protocols including, for example, Time Division Multiple Access ("TDMA"), Code Division Multiple Access ("CDMA") or other self-forming mesh communication network protocols.

Those having skill in the art will recognize that tracking system 110 and computer 120 may each include one or more physical processors, one or more interfaces (to various peripheral devices or components), one or more memory and/or other components coupled via respective buses. The memory may comprise random access memory (RAM), read only memory (ROM), floppy disks, hard disks, optical disks, tapes, and/or other tangible computer readable store media for storing computer-executable instructions and/or data. One or more applications, including mapping application 130, may be loaded into memory and program the processor to perform the functions of mapping application 130. Mapping application 130 may comprise software module(s) which may enable the features and functionality and implement the various methods (or algorithms) described in detail herein. According to an aspect of the invention, an Application Program Interface (API) may be provided to, for example, enable third-party developers to create complimentary applications, and/or to enable content exchange.

According to an aspect of the invention, processing the sensor information from a tracking system 110 may be performed completely at the tracking system, partially at the tracking system 110 and partially at a remote device such as computer 120 or another tracking system 110, completely at the computer 120 or another tracking system 110, and/or other configurations. For example, tracking system 110C configured as an integrated single unit may process the sensor information locally and/or may provide at least some of the sensor information to computer 120 for at least partial processing at the computer 120. Other configurations will be apparent based on the disclosure herein to those having skill in the art.

Map Information

Map information (including, for example, floor plans and other building data or location data) may be obtained from a variety of sources without limitation, or else generated as described herein. According to an aspect of the invention, computer 120 may access an Internet web site, an intranet site, or other site or application hosted by one or more servers (170a, 170b, . . . 170n) or other computers over a network 160 (via a wired or wireless communications link) to obtain map information. Map information may be obtained, for example, from MICROSOFT VIRTUAL EARTH, GOOGLE EARTH, Geographic Information Systems (GIS) maps, or from other sources.

Network 160 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), or other network.

Map information, personnel information (e.g., name, age, height, weight, hair color, eye color, etc. of a person) asset information, and/or other information may be stored locally on computer 120, or in one or more databases (180A, 180B, . . . 180N) or other storage devices operatively connected to computer 120. Similarly, information collected from one or more tracking systems (110A, 110B, 110C, . . . 110N) such as, for example, INU data, physiological data (e.g., heart rate, respiration rate, etc.) from a user, environmental information (e.g., temperature, atmospheric pressure, background radiation, etc.), or other status, situational, or other information may likewise be stored locally on computer 120, or in one or more databases (180A, 180B, . . . 180N) or other storage devices operatively connected to computer 120.

It should be recognized that any database generally referenced herein (e.g., a building database) may comprise one or more of databases (180A, 180B, . . . 180N) or other storage devices. Additionally, any data or information described as being stored in a database may also be stored locally on computer 120.

Various aspects of the invention, as described herein, may utilize and integrate different methodologies and system components to determine the location of tracked personnel and/or assets. Data may be fused electronically, using hardware and software, to minimize tracking error from any single data set or sensor. The system and method of the invention may integrate Inertial Navigation, including MEMS, GPS when available, and signal processing and control algorithms incorporated in hardware and software to process (e.g., integrate) sensor information and determine, among other things, the location, motion, and orientation of personnel and/or assets inside complex structures (or at other locations or environments).

The foregoing description of the various components comprising system architecture 100 is exemplary only, and should not be viewed as limiting. The invention described herein may work with various system configurations. Accordingly, more or less of the aforementioned system components may be used and/or combined in various implementations.

Moreover, additional description of the CSM 112, INU 114, and of other components of system 100 may be found in United States Patent Application Publication No. 2008/0077326 A1 to Funk et al., published Mar. 27, 2008, entitled "METHOD AND SYSTEM FOR LOCATING AND MONITORING FIRST RESPONDERS" (U.S. application Ser. No. 11/756,412, filed May 31, 2007), which is hereby incorporated by reference herein in its entirety.

Further, additional description of locating, tracking, and/or monitoring trackees, and of other components of system 100 may be found in United States Patent Application Publication No. 2009/0043504 A1 to Bandyopadhyay et al., published Feb. 12, 2009, entitled "SYSTEM AND METHOD FOR LOCATING, TRACKING, AND/OR MONITORING THE STATUS OF PERSONNEL AND/OR ASSETS BOTH INDOORS AND OUTDOORS" (U.S. application Ser. No. 12/187,067, filed Aug. 6, 2008), which is hereby incorporated by reference herein in its entirety.

Mapping Application

Figure 3:
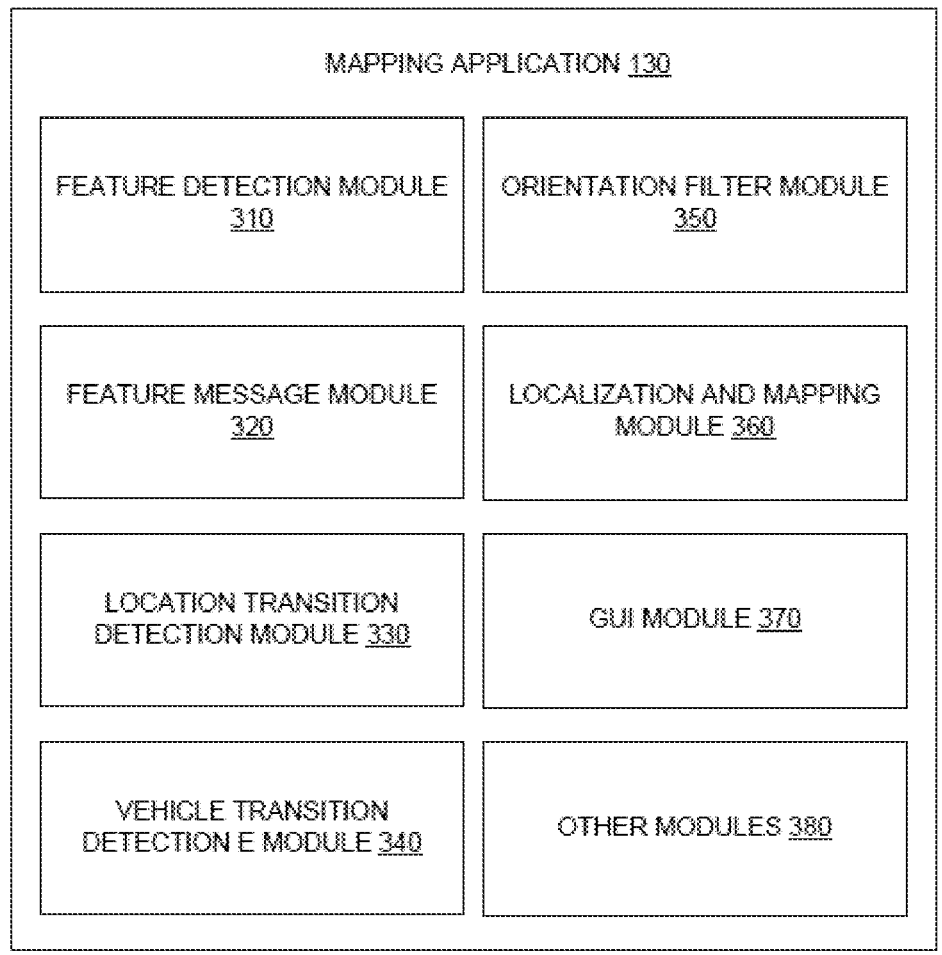
FIG. 3 is an exemplary block diagram of a mapping application, according to an aspect of the invention.

FIG. 3 is an exemplary block diagram of a mapping application, according to an aspect of the invention. According to an aspect of the invention, tracking system 110 and/or computer 120 (each illustrated in FIG. 1) may be programmed with at least some modules of mapping application 130. Through various modules, mapping application 130 may provide one or more user interfaces, localize a trackee, map a location, and/or perform other functions with or without a priori knowledge of the location.

For example, mapping application 130 may include a feature detection module 310, a feature message module 320, a location transition detection module 330, a vehicle transition detection module 340, an orientation filter module 350, a localization and mapping module 360, a Graphical User Interface ("GUI") module 370, and/or other modules 380.

Feature Detection

According to an aspect of the invention, feature detection module 310 may be configured to detect sensor features based on the inertial sensor information and/or other types of sensor information. For example, inertial sensor information may include one or more measurements of a motion made while a trackee is traversing the location that is suitable for tracking Feature detection module 310 may detect a particular motion or motions based on the measurements and correlate the measurements with a sensor feature. The sensor feature may be individually identifiable such that sensor algorithms may recognize such sensor features when encountered again or revisited. According to an aspect of the invention, the sensor features may be associated with a location estimate and saved to create or update a map of the location, which may be used to aid navigation. For example, individually identifiable acceleration patterns may occur in an elevator as it moves. These acceleration patterns may be used to identify that the trackee is in an elevator. Once the elevator has been detected, the location of the feature is then estimated based on the trackee's sensor data. If the feature is new, this estimated location may be used to map the feature. If the elevator is revisited and can be recognized as being the same elevator using proximity or other signature information, then using SLAM algorithms, the accumulation of error over the intervening period between the initial visit and the revisit may be eliminated or reduced.

Other types of sensor features such as optical features, magnetic features, and/or other features may be determined using various types of sensors. According to an aspect of the invention, whichever type or combination of types of sensor information is used to detect sensor features, sensor features may be correlated to structural features such as a hallway, a stairwell, an elevator, an entrance/exit, and/or other features of a building or other structure. For example, a structural feature may be inferred based on output from inertial sensors and/or other types of sensors.

Feature Messages

According to an aspect of the invention, feature message module 320 may generate feature messages based on sensor information that is output from the inertial sensors. A feature message may include a descriptor that describes individually identifiable sensor features based on the sensor information from the inertial sensor. Sensor features may be individually identifiable when they can be distinctly identified from other sensor features and/or when such sensor features are unique at a location. The data collected from the inertial sensors while the trackee is traversing a structure such as a building may be input to feature detection module 310, as described below. Feature detection module 310 may process the data from the inertial sensors and identify structural features that correspond to the individually identifiable sensor features based on one or more feature parameters. The feature parameters may use high sensor polling (e.g. inertial elevator detection, unambiguous stair winding, etc.).

According to an aspect of the invention, the feature messages may be used to create an internal map of the structure on the fly, either at tracking system 110, computer 120, and/or other computing device. According to an aspect of the invention, user location may be determined and corrected based on matching to the generated structural features.

According to an aspect of the invention, the structural features may include elevators, hallways, stairwells, and/or other man-made or natural structural features. According to an aspect of the invention, the structural features may be extended to discover other features such as rooms (entered and exited at one or more locations), doorways, etc.

According to an aspect of the invention, the structural feature messages may be formatted according to a general format with the addition of one or more unique parameters to describe specific features. The messages may indicate, for example: (1) the location of the corresponding feature on the path by start and end times, (2) unique index increments for each new feature element, (3) feature construction parameters (e.g., for hallway messages, these parameters may include hallway width, hallway length, etc.), and/or other information.

According to an aspect of the invention, for each structural feature, feature message module 320 may generate different types of messages such as "parent messages," "child messages," and/or other types of messages. The "child messages" describe the parts of a feature. For example, the "child message" for a stairwell describes a flight of the stairwell. The "parent messages" describe the summary of a whole feature. For example, the "parent message" for a stairwell may describe the complete stairwell (such as a configuration, up-rotation, etc.) and may be generated after the tracked subject leaves the feature area. According to an aspect of the invention, each child message may be associated with other sensor features. This unique feature information, such as magnetic signatures or signal strength features, may be used to improve uniqueness and later matching of the inferred features.

When generated at tracking system 110, feature messages may be processed locally by tracking system 110 and/or communicated to a remote device such as computer 120 for remote processing. The various types of sensor features that may be detected will now be described, followed by various types of structural features that may be inferred based on the different types of sensor features and/or types of sensor measurements.

Optical Features

Figure 4:
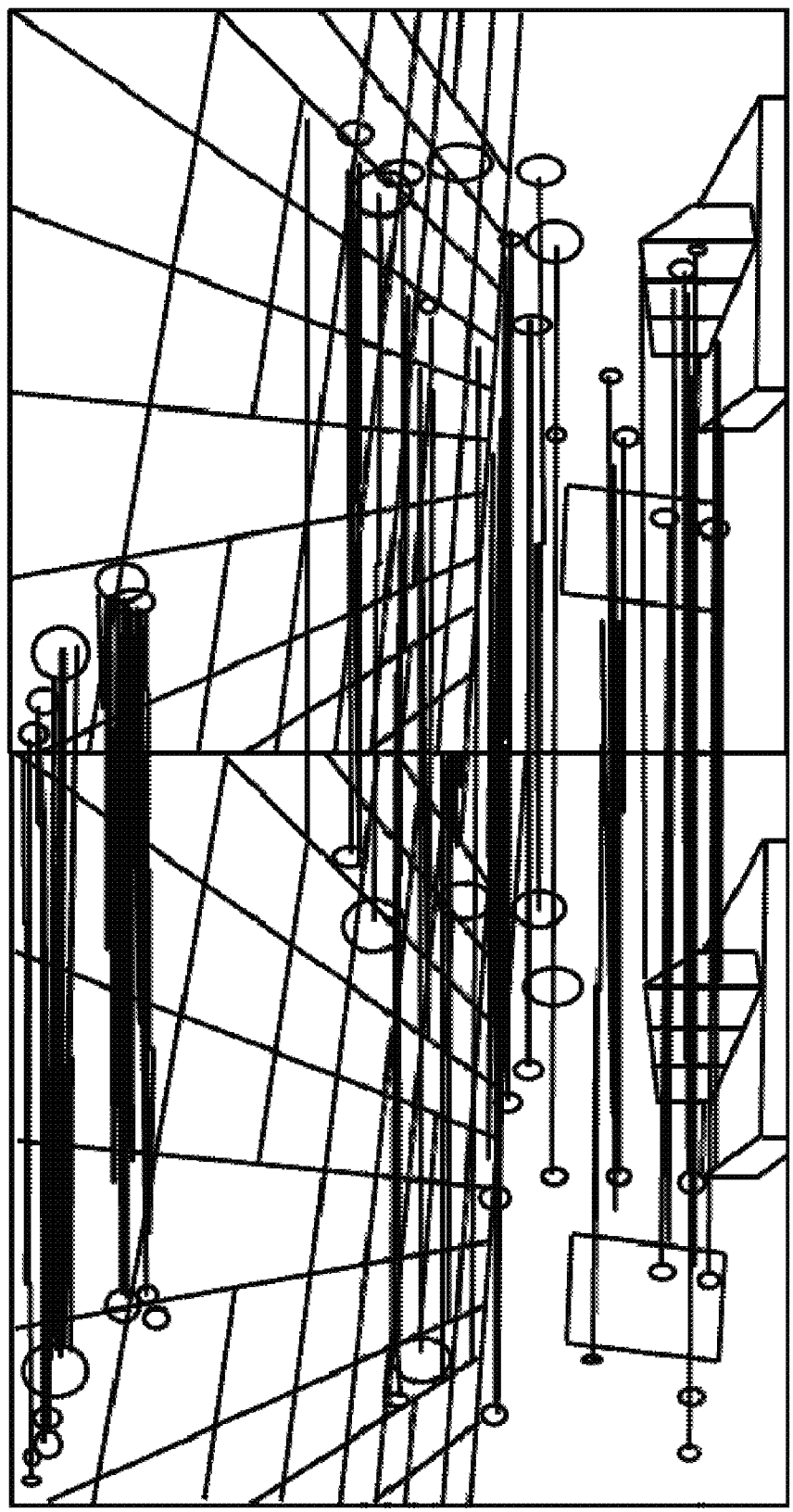
FIG. 4 is an exemplary illustration of stereo optical feature tracking, according to an aspect of the invention.

FIG. 4 is an exemplary illustration of stereo optical feature tracking, according to an aspect of the invention. Feature detection module 310 may determine a landmark based on optical sensor information (e.g., imaging information), determine a relative location of the landmark, and store the landmarks and relative location. When a subject revisits the landmark, if any errors in position have accumulated, the subject's location can be updated based on the landmark's prior location estimate.

Selecting and matching landmarks in varying conditions may be a difficult problem for a machine vision system. For example, a challenge for a machine vision system is to reliably identify an object when the object is viewed from different perspectives, distances, and lighting conditions. Some machine vision systems determine particular features of an object together with their relative spatial locations to provide a feature-based description of the object that is robust to changes in perspective, distance, and lighting conditions. Another challenge for machine vision systems is to detect objects and structures that are partially blocked. Feature-based approaches may treat an object as the sum of its parts rather than the precise match of the whole, thereby providing effective solutions to detect partially blocked objects or structures.

Another challenge for a machine vision system is that optical landmarks may be associated with perceptual aliasing. For example, in an office building, many doors may look the same as other doors. Conventional machine vision systems have been developed to address the perceptual aliasing problem with varying degrees of robustness. Algorithms trade off computational complexity to achieve better object recognition performance. According to an aspect of the invention, mapping application 130 may configured to use Speeded Up Robust Features ("SURF") for its performance with respect to repeatability, distinctiveness, robustness and speed relative to other feature methods. According to an aspect of the invention, mapping application 130 may configured to use LK-SURF, which is a hybrid feature tracker that uses SURF features for detection and stereo matching, then modifies them to use Lucas-Kanade feature tracking over time.

According to an aspect of the invention, sensor features and/or correlated structural features may be used to provide navigation corrections when a sensor feature is revisited as well as be used to generate or update the map of the location.

Magnetic Features

Conventional techniques have used magnetic signatures for location information in building corridors over multiple traversals of the same hallways. While there were minor variations, the signatures were consistent enough to allow location identification after traversing a short segment in the tested set of hallways.

However, the technique described above used continuously matching path segments, which (in a large dataset) is computationally costly. Additionally, an a priori map as was the case for the technique described above may not be available. In an aspect of the invention, mapping application 130 may build a map of magnetic features as the subject traverses an area, and use the map for corrections in a SLAM implementation.

According to an aspect of the invention, mapping application 130 may select only particular features in order to minimize computational load. Careful consideration of feature selection may be important for robustness. For example, an approximately constant field may be relatively easy to match. Indoor environments typically provide a rich set of features for magnetic signatures. On the other hand, in outdoor environments, magnetic features may be sparse or indistinguishable. Once a feature is confirmed it may be deemed a landmark with an associated position. Recognized revisits to the landmark may be used to provide a mechanism for mitigating accumulated dead reckoning errors.

Figure 5:
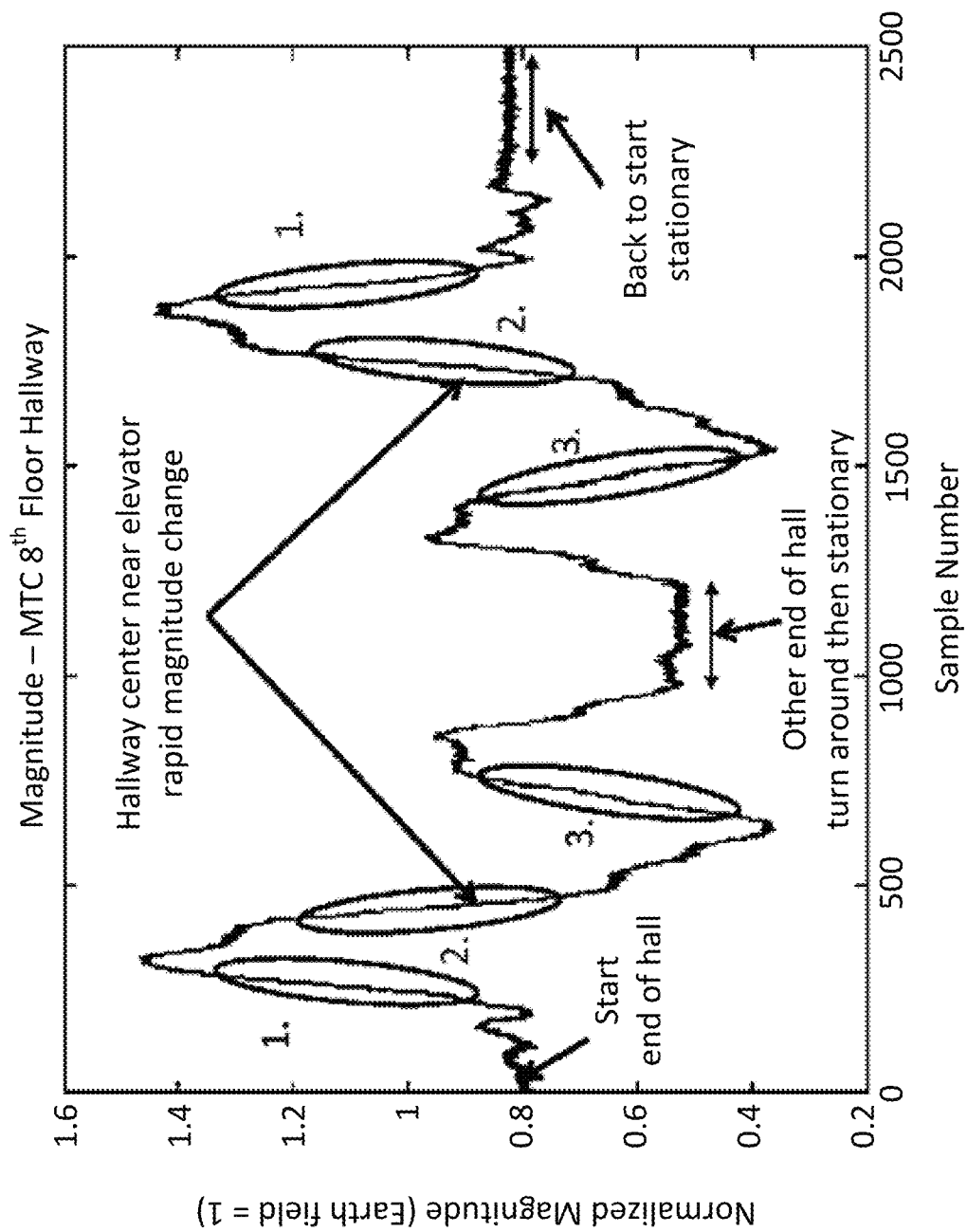
FIG. 5 is an exemplary illustration of magnetic field variation over time as a hallway is traversed, according to an aspect of the invention.

FIG. 5 is an exemplary illustration of magnetic field variation over time as a hallway is traversed, according to an aspect of the invention.

A well-localized magnetic feature such as an extrema or a sharp transition in magnetic magnitude is illustrated. These types of sharp transitions are common in manmade structures with power systems and other metal that cause magnetic disturbances. As illustrated in FIG. 5, the magnitude of the magnetic field vector as a subject traverses back and forth in the hallway in an office building may result in a consistent signature. Furthermore, three sharp transition features are selected from the hallway traversal, which are readily seen in each traversal.

Figure 6:
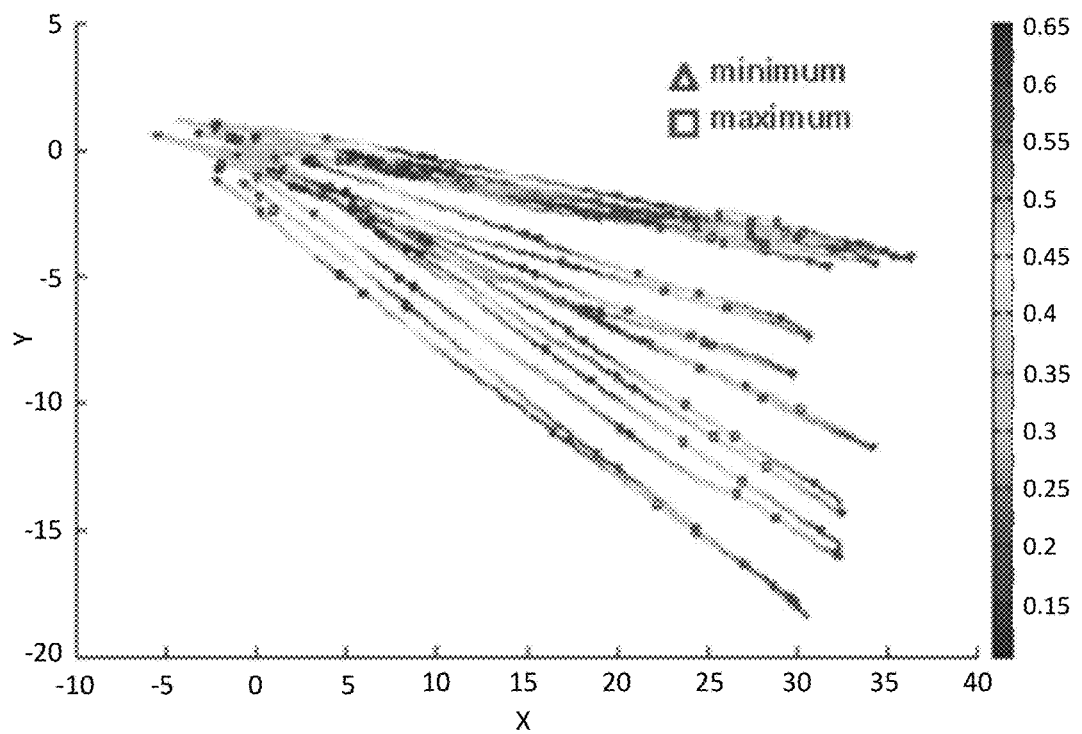
FIG. 6 is an exemplary illustration of magnetic features superimposed on an inertial track, according to an aspect of the invention.

FIG. 6 is an exemplary illustration of magnetic features superimposed on an inertial track, according to an aspect of the invention.

The magnetic features are shown superimposed on a plot of the inertial path data of a user traversing back and forth in the hallway ten times. The inertial path shows clear scaling and drift errors. A path color (illustrated in grey scale) may be used to represent the magnetic field magnitude. For each of the three magnetic features, a min (triangle) and max (square) value are marked on the path.

Figure 7:
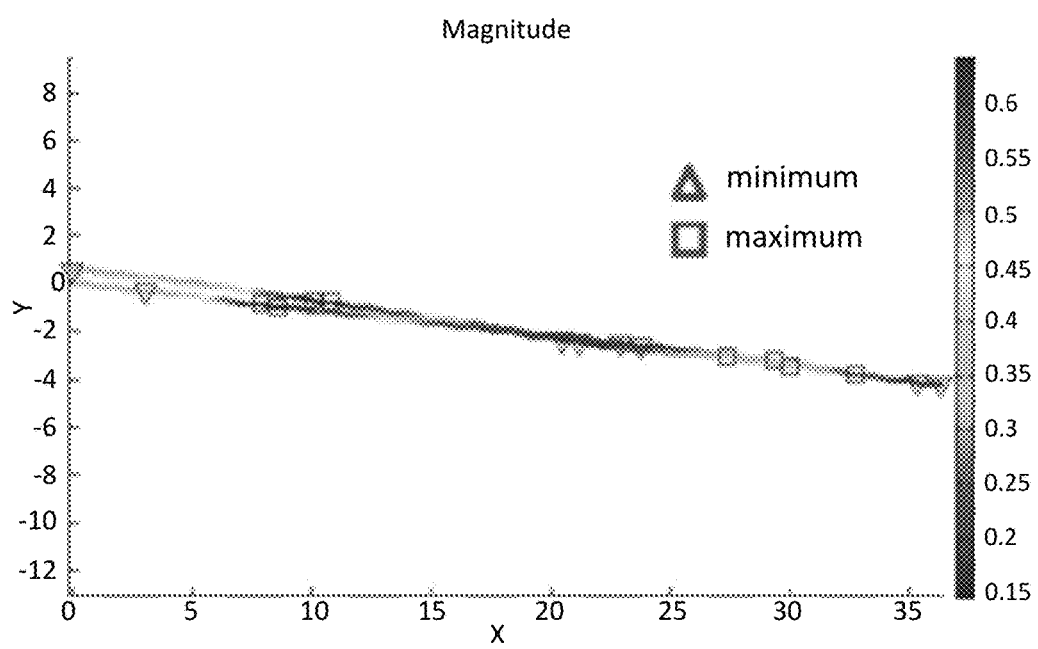
FIG. 7 is an exemplary illustration of a zoomed-in view of magnetic features superimposed on an inertial track, according to an aspect of the invention.

FIG. 7 is an exemplary illustration of a zoomed in view of magnetic features superimposed on an inertial track while a subject moves back and forth one time in the hallway described in FIG. 6, according to an aspect of the invention.

These figures indicate that the features may offer some scaling and drift correction.

According to an aspect of the invention, for signal based features such as magnetic fields, high sample rate data or other derived parameters may be saved as a feature descriptor detailing the unique aspects of the feature that can be used for matching if the features are observed at a later time. While the example above illustrates magnetic data, signature mapping may be used with other types of sensor information, such as radiation measurements or signal strength, as well as vector representations of the data.

Inference-Based Features

According to an aspect of the invention, feature detection module 310 may be configured to correlate inertial sensor features and/or inertial sensor measurements with a structural feature based on a trackee's measured motion. Feature detection module 310 may use other types of sensor features and/or other types of sensor measurements for the correlation as well.

A standard approach to tracking is to use the INU in a dead reckoning mode, making use of the idiothetic dead reckoning information provided by the INU sensors. Inertial sensors can provide allothetic map reference data by inferring the location of terrain features based on how the subject moves through the environment.

According to an aspect of the invention, identifying this additional map information may enhance the INU to function as a smart, standalone positioning device providing rich input to mapping application 130 implementing SLAM algorithms. For example, in buildings, rigid assumptions may be made on their architecture to aid in identifying structural features and the underlying map. The existence of a hallway may be inferred if a subject moves for a long period in a confined straight area. Climbing stairs may indicate the presence of a stairwell, and an elevation change without climbing stairs may infer an elevator. For each inferred feature, its location and orientation may be known based on the idiothetic information. These geospatial constraints placed on the navigation solution can mitigate the accumulation of inertial dead reckoning errors. Postulated knowledge of hallways and other building grid constraints may be enforced on the navigation solution to yield an effective angular drift correction.

Although these same rigid assumptions about structure are not necessarily applicable in natural environmental structures such as caves that lack hallways and elevators, these natural environmental structures do have a rigid structure that can be similarly mapped. For example, features such as curved and straight path segments, and elevation changes of natural structures can be identified and mapped in a manner similar to hallways and elevators.

Elevators

According to an aspect of the invention, feature detection module 310 may identify an elevator feature of a building based on inertial sensor information and/or other types of sensor information. According to an aspect of the invention, feature message module 320 may generate a parent message for an elevator called a "shaft message." The shaft message may be generated when a tracked subject exits the elevator after entering it. Thus, the shaft message describes the unique physical characteristics of the corresponding elevator as experienced by the tracked subject. These might include, for example, location, key features in acceleration data, and/or magnetic sensor information, etc. The "experience of the tracked subject" may be recorded in the tracked subject's tracking system. While the tracked subject is in the elevator, the elevator may make numerous stops. According to an aspect of the invention, feature message module 320 may generate a "child message" called a "trip" based on individual start and stop indications. Therefore, a "trip" may describe different parts of an elevator feature. For example, if a tracked subject enters an elevator at the 3rd floor and goes to 6th floor, and then goes to the basement, there would be two trips (one describing the characteristics of the elevator from the 3rd floor to the 6th floor, and the other from the 6th floor to the basement, and each corresponding to a child message called a "trip") as well as one shaft summarizing the feature from the basement to the 6th floor.

In this aspect of the invention, the detection of start and stop may be based on sustained accelerations, either up or down (z axis in navigation/earth frame), greater than a threshold. When the acceleration in (earth reference) z direction (up) crosses a certain threshold, the likelihood of the presence of an "elevator trip" increases, and when this likelihood crosses a certain predetermined threshold, the start of an "elevator trip" is detected. Once a "trip" is detected, an "elevator shaft" feature may be initiated. When the elevator comes to a halt, the z acceleration again crosses a certain threshold which is detected as the end of the "trip." According to an aspect of the invention, false detection may be minimized by inserting other logical criteria including trip timing and comparison with other sensor information. When the tracked subject exits the elevator and traverses a predetermined distance threshold, the "shaft" message may be packed and transmitted.

Figure 8:
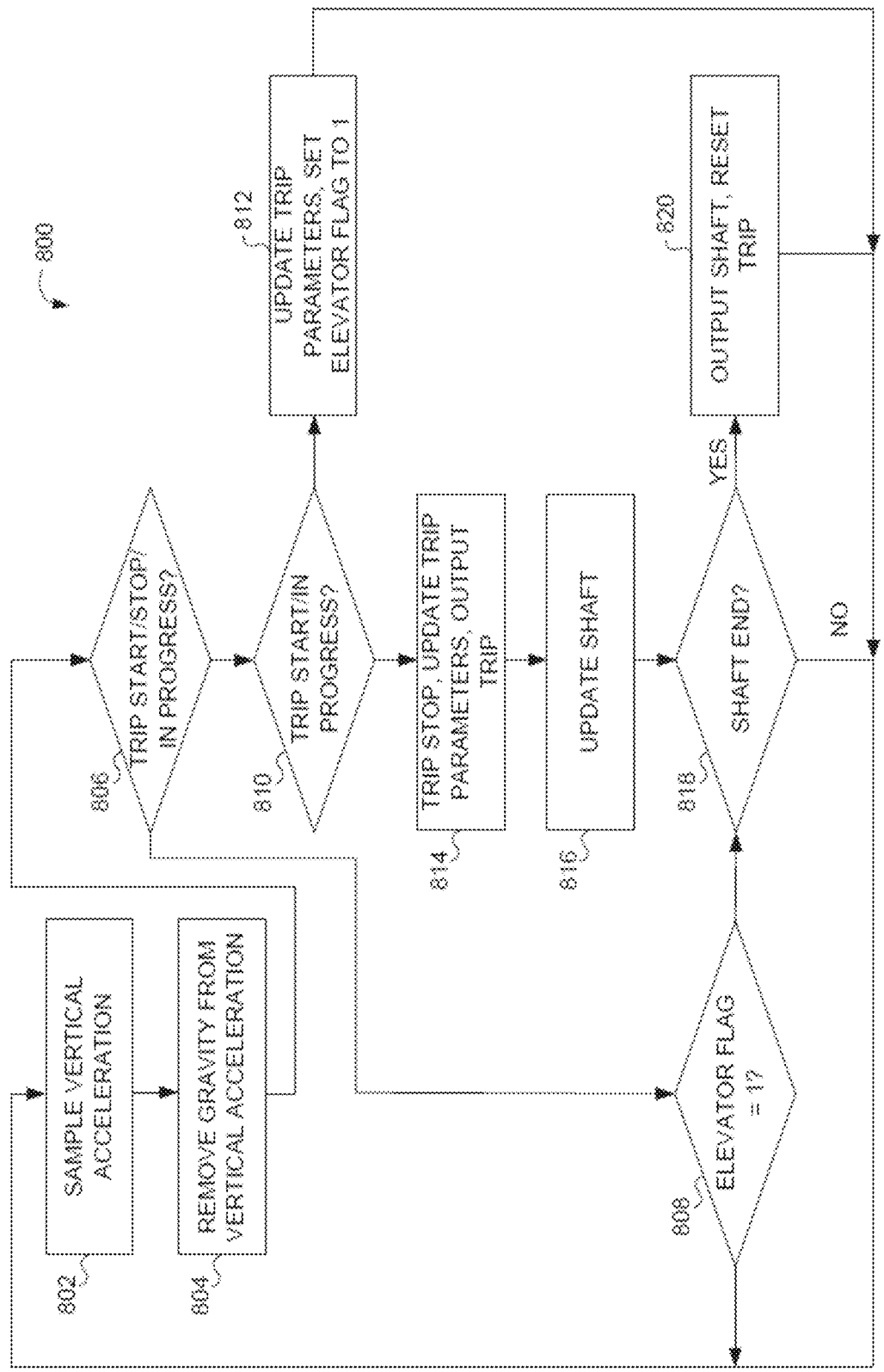
FIG. 8 is an exemplary illustration of various processing operations of a process for determining an elevator feature, according to an aspect of the invention.

FIG. 8 is an exemplary illustration of various processing operations of a process 800 for determining an elevator feature, according to an aspect of the invention. The various processing operations depicted in the flowchart of FIG. 8 are described in greater detail herein. The described operations may be accomplished using some or all of the system components described in detail above. For example, feature detection module 310 may be configured to perform some or all of the operations of process 800.

According to an aspect of the invention, various operations may be performed in different sequences. In other implementations, additional operations may be performed along with some or all of the operations shown in FIG. 8, or some operations may be omitted. In yet other implementations, one or more operations may be performed simultaneously. Accordingly, the operations as illustrated (and described in greater detail below) are exemplary in nature and, as such, should not be viewed as limiting.

In an operation 802, vertical acceleration may be sampled. For example, 3-axis accelerometer data may be sampled at a sampling frequency ($f_s$) of 40 Hz. Other types of sensor information and/or different sampling frequencies may be used as well.

In the navigation frame, the accelerometer may be oriented such that the z axis is up, the x axis points to the right of the unit, and the y axis points forward. If the INU 114 that produces the accelerometer data is tilted from this frame (often there is a slight tilt when people are walking), a method of removing tilt may be implemented. Assuming zero (or near zero) non-gravitational acceleration, the accelerometer data can be used to obtain a noisy measurement of pitch and roll relative to the ground frame allowing the user to remove tilt using only accelerometer input. More reliable tilt compensation is possible if information from 3 axis gyros is also available. For example, an orientation filter, which uses both accelerometer and gyro information, may be used to provide more robust orientation information as described below with respect to orientation filter module 350.

In an operation 804, once oriented in the navigation frame, gravitational acceleration may be removed from the vertical (z) acceleration. For example, operation 804 may be performed based on the equation:

$$\bar{a}_z = a_z - g \quad (1)$$

wherein:
$\bar{a}_z$ represents a normalized vertical acceleration,
$a_z$ represents vertical acceleration, and
g represents gravity.

In an operation 806, the normalized vertical acceleration may be passed through an elevator trip start detector (e.g., feature detection module 310). The start detector may comprise a comparator and a counter. The comparator compares the normalized vertical acceleration with positive or negative threshold acceleration (noise). If the normalized vertical acceleration crosses the positive threshold, the counter is incremented (if the counter is less than zero, it is reset to zero and then incremented) and if the normalized vertical acceleration crosses the negative threshold, the counter is decremented (if the counter is greater than zero, it is reset to zero and then decremented), otherwise the counter is reset to zero. If the counter crosses a predetermined positive threshold, it indicates the start of a trip in the positive Z direction which indicates an Up-Trip. If the counter crosses a predetermined negative threshold, it indicates the start of a trip in the negative Z direction which indicates a Down-Trip. Once the trips start (operation 810), the trip parameters such as start time, and/or start height, etc. are updated, the elevator flag is set to 1 in an operation 812, and processing may return to operation 802, where the data is sampled again.

Trip parameters such as maximum acceleration, minimum acceleration and/or maximum velocity, etc., may be updated at each sample between the start of a trip and the end of a trip (when the trip is in progress) in an operation 812.

Once a trip start is detected, the stop detector, in operation 806, is run at each sample after start. $\bar{a}_z$ is passed through an elevator trip stop detector (e.g., feature detection module 310). The stop detector may include a comparator and a counter. The comparator compares $\bar{a}_z$ with positive or negative threshold acceleration (noise). If $\bar{a}_z$ crosses the positive threshold, the counter is incremented (if the counter is less than zero, it is reset to zero and then incremented) and if $\bar{a}_z$ crosses the negative threshold, the counter is decremented (if the counter is greater than zero, it is reset to zero and then decremented), otherwise the counter is reset to zero. If the counter crosses a predetermined positive threshold and a Down-Trip is in progress, it indicates the finishing of a trip in the negative Z direction, which indicates a Down-Trip. If the counter crosses a predetermined negative threshold and an Up-Trip is in progress, it indicates the finishing of a trip in the positive Z direction, which indicates an Up-Trip.

Once a trip is finished, update trip parameters such as end time and identification number.

Generate a Trip Message and transmit, 814. Update elevator shaft parameters such as shaft start time, end time, maximum height, and/or minimum height, etc, 816. The first trip indicates the start of the shaft. Trip parameters are reset to zero. When an elevator shaft is in progress, operations 802, 804, 806, 810, and 812 are repeated. If another trip for the same shaft is detected, operations 814, 816, are completed and the shaft is updated with the current trip. Additionally, the horizontal distance between the elevator and the current location may be measured at each sample. If this distance exceeds a predetermined elevator bound 818, an elevator shaft is finished; elevator shaft message is generated and transmitted in an operation 820. The trip parameters are reset back to zero for a future shaft in operation 820, such that when elevator flag is not equal to one in an operation 808, processing returns to operation 802.

Hallways

According to an aspect of the invention, feature detection module 310 may identify a hallway feature of a building based on inertial sensor information and/or other types of sensor information. According to an aspect of the invention, feature message module 320 may generate a parent message for a hallway may be called a "hallway" and a child message called a "segment." A segment may include a width-confined section of a path with a length of approximately L meters (e.g., L=5, although other lengths may be used) and width less than a threshold width (W) (e.g., W=1.5, although other threshold widths may be used). A "hallway" may be made up of several "segments" of which the last segment could be a partial segment of shorter length. A "hallway" may be created for every width-confined section of the path before the tracked subject deviates from the width confinement. Once the deviation from the width confinement is encountered, the respective "hallway" comes to an end and a final hallway length ($L_f$) is determined.

According to an aspect of the invention, because the tracked subject may traverse only a partial length (including a subset of segments) of a full hallway, feature detection module 310 may break down the hallway feature into a number of segments to assist subsequent feature matching. The hallway may be represented based on its bounding box of width (W) and length ($L_f$), with central line start and stop location and heading, or by the central line itself and containing points of maximum deviation of W/2 from the central line. In this example, the width confinement is implemented using a linear regression on the path points and enforcing a maximum deviation of W/2. The threshold for deviation from the width confined path which creates a "turn" at which point the hallway ends and a final hallway length ($L_f$) is determined.

Feature detection module 310 may use x and y locations of path points as inputs to determine a hallway feature. Using the x and y locations of path points over a predetermined interval, a check is made to see whether the path points fit within the bounding box of a hallway (or are within threshold width of the linear regression line). If there is a fit, feature detection module 310 may recognize a segment feature and a hallway feature and feature message module 320 may generate corresponding "segment" and a "hallway" messages. A new "segment message" may be output after every L meters as long as the path points fit in the bounding box. If the path points overflow the bounding box, it marks the end of the "hallway" and a hallway feature message is sent. If the corresponding "segment" of the "hallway" is less than L meters, a partial "segment" may be output as well.

Figure 9A:
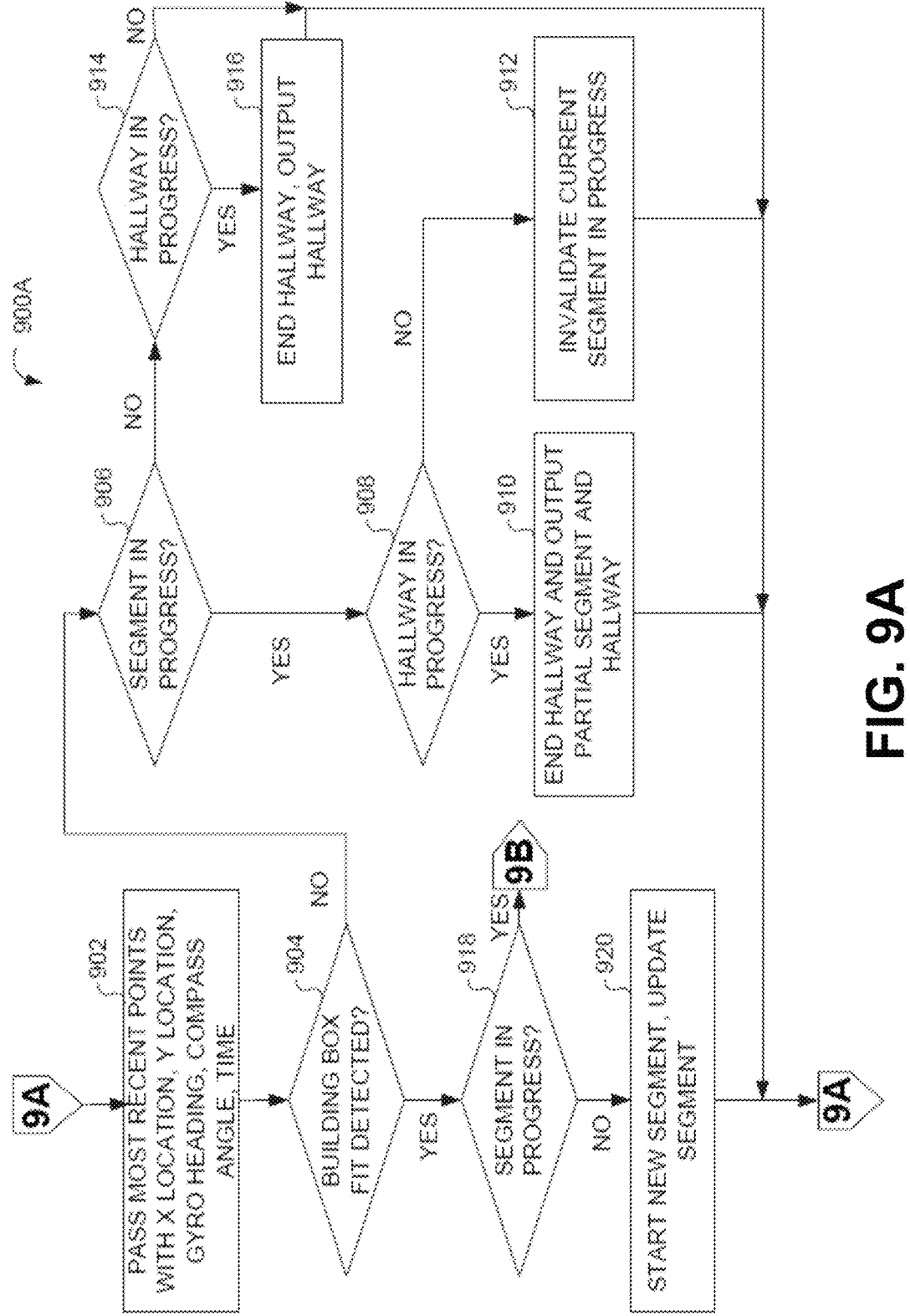
FIG. 9A is an exemplary illustration of various processing operations of a process for determining a hallway feature, according to an aspect of the invention.
Figure 9B:
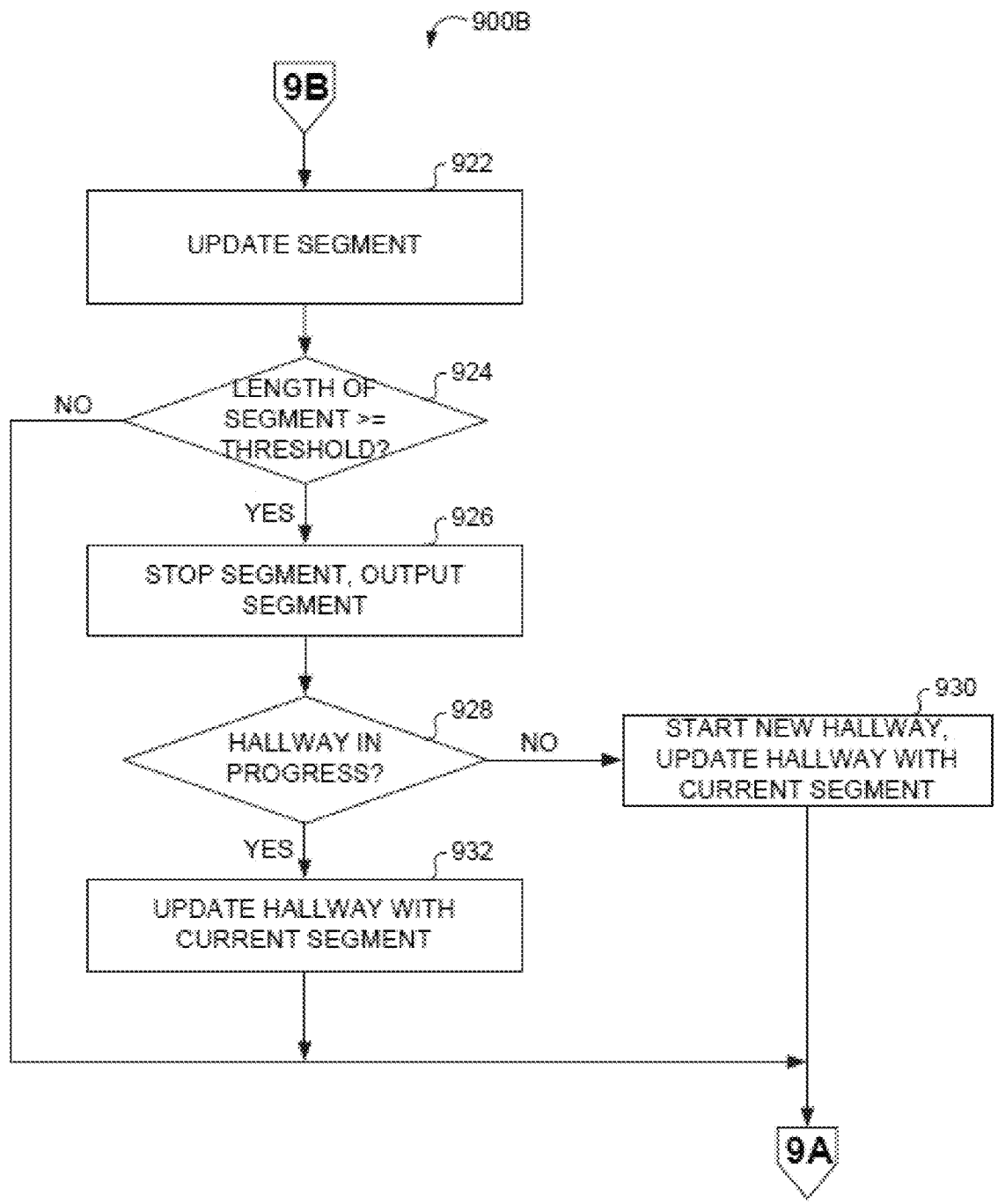
FIG. 9B is an exemplary illustration of various processing operations of a process for determining a hallway feature, according to an aspect of the invention.

FIGS. 9A and 9B together illustrate various processing operations of a process 900 (illustrated for convenience as processes 900A and 900B) for determining a hallway feature, according to an aspect of the invention. The various processing operations depicted in the flowchart of FIGS. 9A and 9B are described in greater detail herein. The described operations may be accomplished using some or all of the system components described in detail above. For example, feature detection module 310 may be configured to perform at least some of the operations of process 900.

According to an aspect of the invention, various operations may be performed in different sequences. In other implementations, additional operations may be performed along with some or all of the operations shown in FIG. 9, or some operations may be omitted. In yet other implementations, one or more operations may be performed simultaneously. Accordingly, the operations as illustrated (and described in greater detail below) are exemplary in nature and, as such, should not be viewed as limiting.

According to an aspect of the invention, process 900 may be iterated as new path points (e.g., measurements of a sensor) are obtained by an inertial sensor and/or other types of sensors. For example, processing may iterate back to iteration point "9A" as illustrated in FIGS. 9A and 9B.

In an operation 902, a number of path points that exceeds a threshold value is obtained. Each path point may have associated sensor information. The threshold value may be based on the minimum length, L, of first segment (e.g., L=5 meters, although other lengths may be used). The x and y locations, Gyro Heading, Compass angle, Time, and/or other sensor information at each path point may be provided to feature detection module 310.

In an operation 904, a determination of whether a bounding box fit is detected may be made. A bounding box fit is detected when N path points (e.g., three path points, although other number of path points may be used as well) fit within a bounding box of average hallway width.

When a bounding box fit is not detected, a determination of whether a segment is in progress may be made in an operation 906. When the segment is in progress, at each iteration, a determination of whether a hallway is in progress may be made in an operation 908.

If the hallway is in progress and if the length of the current segment in progress is less than L meters, the segment is finished and a partial segment is generated and transmitted in an operation 910. The hallway is also updated with the partial segment and finished and may be transmitted (e.g., as a hallway feature message).

Returning to operation 908, if the hallway is not in progress, the segment in progress may be invalidated and segment parameters reset to zero in an operation 912.

Returning to operation 906, if there is no segment in progress, a determination of whether a hallway is in progress may be made in an operation 914. If a hallway is in progress with preexisting segments, the hallway is terminated and a hallway feature message may be transmitted in an operation 916.

Returning to operation 904, when a bounding box fit is detected, a determination of whether a segment is in progress may be made in an operation 918. If there is no segment in progress, a new segment may be started and segment parameters may be updated in an operation 920.

Returning to operation 918, if a segment is in progress, segment parameters are updated and the length of the segment may be calculated in an operation 922 (referring now to FIG. 9B). In an operation 924, a determination of whether the segment length exceeds or is equal to a segment threshold value (e.g., 5 meters, although other values may be used) may be made.

If the segment exceeds the segment threshold value, the segment may be stopped and a new segment message may be generated and transmitted in an operation 926. In an operation 928, a determination of whether a hallway is in progress may be made. If a hallway is not in progress, a hallway feature is created and the hallway parameters are updated with the generated segment and the segment is reset in an operation 930. If a hallway is in progress, the hallway parameters may be updated with the generated segment and the segment is reset in an operation 932.

Stairwells

According to an aspect of the invention, feature detection module 310 may identify a stairwell feature of a building based on inertial sensor information and/or other types of sensor information. According to an aspect of the invention, feature message module 320 may generate a parent message for a hallway called a "stairwell" and a child message called a "flight."

A "flight" represents a continuous run of stairs between landings. A "stairwell" is made up of one or more "flights." A "flight" may be described in terms of its number of stairs, height and length and a flag representing partial/full "flight". A partial "flight" is one in which a start and stop landing is the same. A partial flight is created when a tracked subject goes up/down a "flight" and then changes direction before hitting the landing and goes back down/up the same "flight." The feature detection module 310 has no knowledge of the full structure of the "flight" and marks it as a partial "flight." This ensures that the generated feature messages accurately represent the structure even though the representation can be partial.

Feature detection module 310 may recognize a "stairwell" based on its configuration and up winding in addition to summary features such as height and/or length, etc. The system may detect the following kinds of stairwell configurations, as illustrated in FIG. 10.

A radial stairwell and a straight stairwell have only one flight. The up rotation of a stairwell is defined as the direction of the rotation of the flights of the stairwell when going up the stairs. The up rotation can either be clockwise, counter-clockwise or none.

According to an aspect of the invention, feature detection module 310 may take as input x, y and z locations of path points and corresponding gait output. For each step, the change in z location with respect to change in x-y location is computed. Using this ratio and the gait value, the probability of a step being a step on the stairs is determined. Once a few continuous stair steps have been detected, a "stairwell" and a "flight" are initiated. After a continuous number of stair steps, when the subject arrives at a landing (no stair steps are detected), the detected steps are grouped as being part of the landing.

According to an aspect of the invention, when the tracked subject transitions from a landing back to another "flight," the start of a new "flight" is detected and the end of the old "flight" is marked and sent out. Note that in this aspect, an old "flight" ends only when a new "flight" is created or the "stairwell" comes to an end.

According to an aspect of the invention, the flight is ended when a certain number of steps are taken on a landing. When a new "flight" starts, the configuration and up-rotation of the "stairwell", based on the angle between the flights, is updated. When the tracked subject walks a particular distance (D) (e.g., D=2 meters, although other distances may be used) without a change in z elevation or a gait type of stairs, the end of the "stairwell" is marked and a feature message is sent out. In the event of a tracked subject climbing up a "flight" and then coming down the same "flight" back again, that "flight" may be marked as a "partial flight". A "partial flight" indicates that only limited information about the structure of the "flight" and the "stairwell" is known.

Figure 11A:
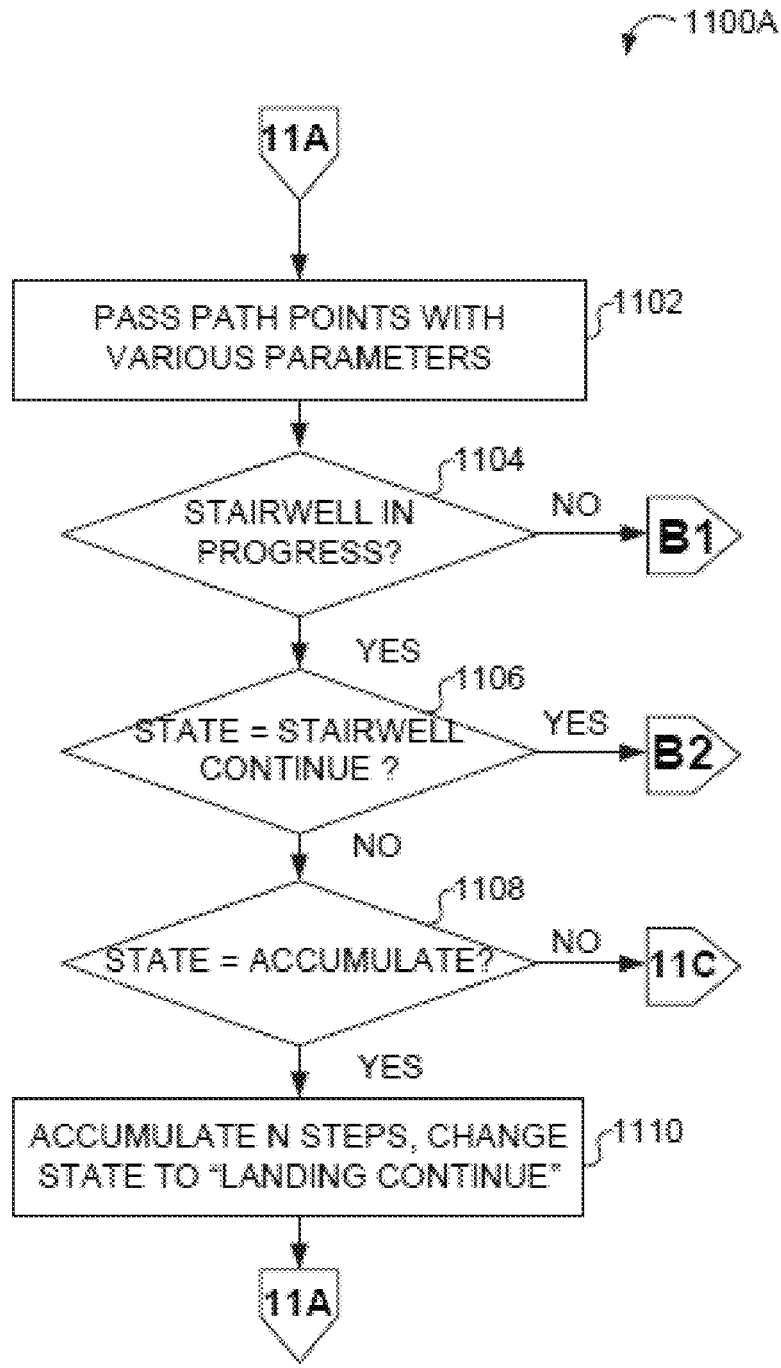
FIG. 11A is an exemplary illustration of various processing operations of a process for determining a stairwell feature, according to an aspect of the invention.
Figure 11B:
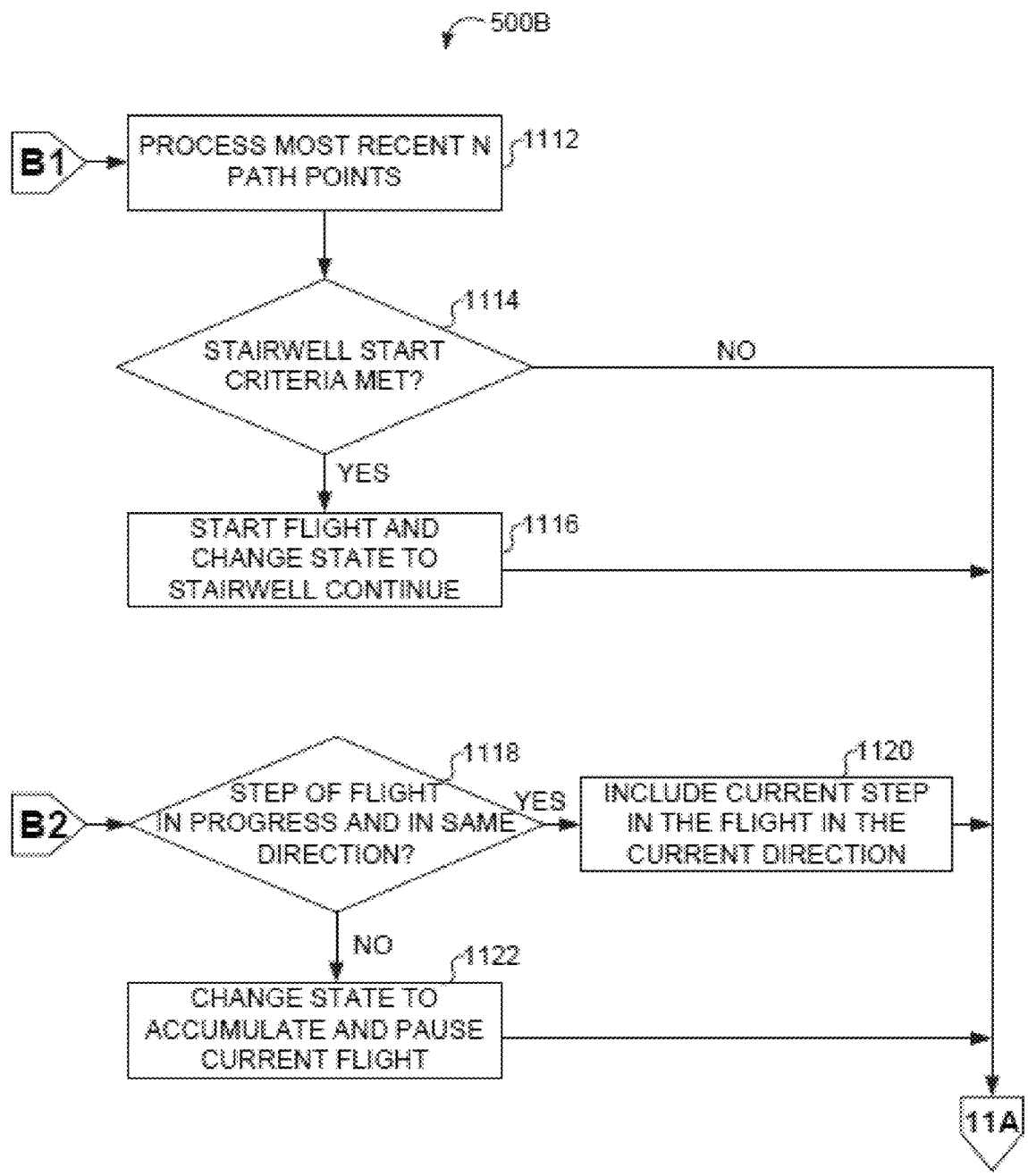
FIG. 11B is an exemplary illustration of various processing operations of a process for determining a stairwell feature, according to an aspect of the invention.
Figure 11C:
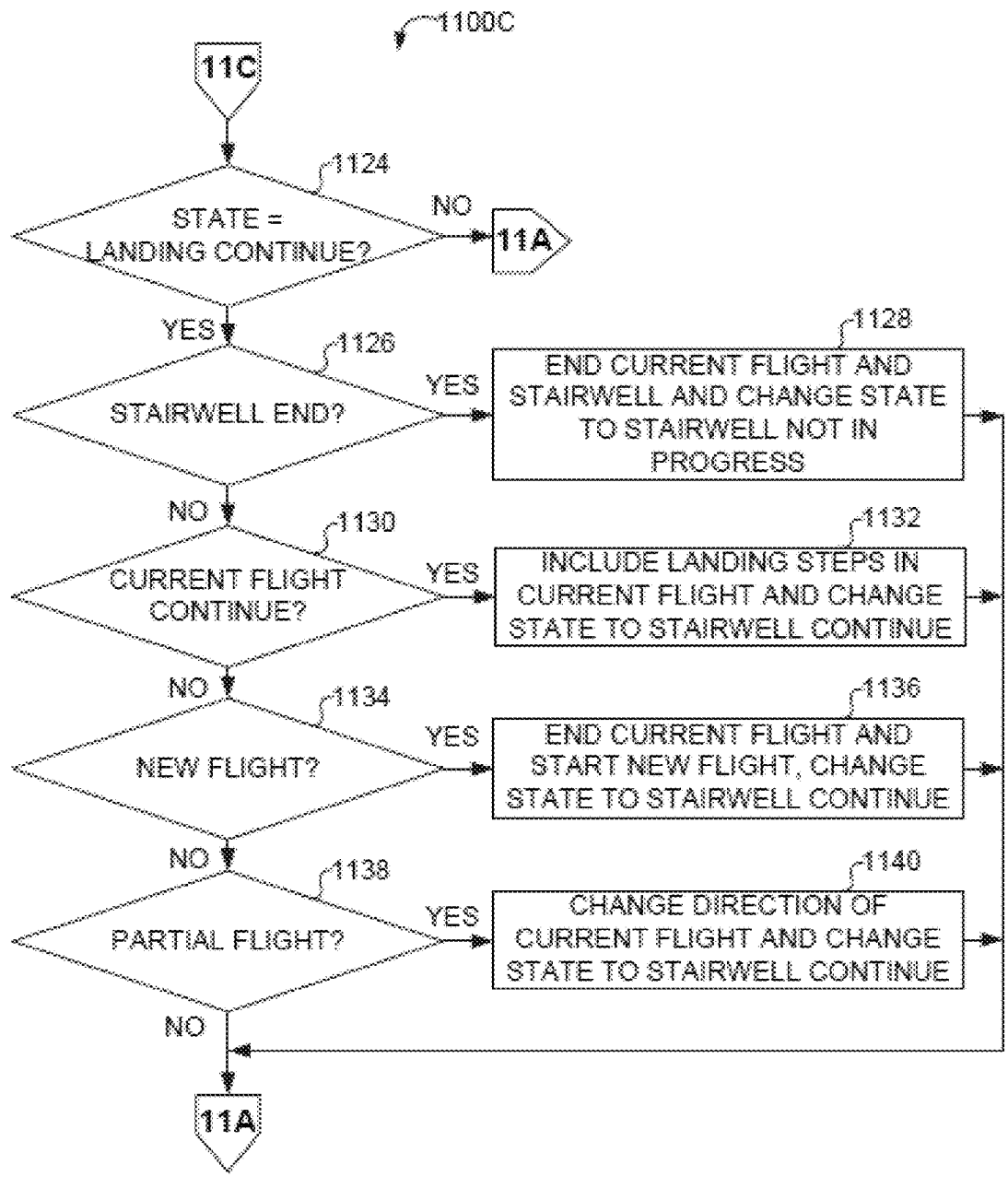
FIG. 11C is an exemplary illustration of various processing operations of a process for determining a stairwell feature, according to an aspect of the invention.

FIGS. 11A, 11B, and 11C together illustrate various processing operations of a process 1100 (illustrated for convenience as processes 1100A, 1100B, and 1100C) for determining a stairwell feature, according to an aspect of the invention. The various processing operations depicted in the flowchart of FIGS. 11A, 11B, and 11C are described in greater detail herein. The described operations may be accomplished using some or all of the system components described in detail above. For example, feature detection module 310 may be configured to perform at least some of the operations of process 1100.

According to an aspect of the invention, various operations may be performed in different sequences. In other implementations, additional operations may be performed along with some or all of the operations shown in FIGS. 11A-11C, or some operations may be omitted. In yet other implementations, one or more operations may be performed simultaneously. Accordingly, the operations as illustrated (and described in greater detail below) are exemplary in nature and, as such, should not be viewed as limiting.

According to an aspect of the invention, process 1100 may be iterated as new path points (e.g., measurements of a sensor) are obtained by an inertial sensor and/or other types of sensors. For example, processing may iterate back to iteration point "11A" as illustrated in FIGS. 11A, 11B, and 11C. The various states described in FIGS. 11A-11C are for illustrative purposes only and may be described using other text.

In an operation 1102, a number of path points exceeding a threshold may be obtained. Each path point may have associated sensor information. The threshold may be based on a minimum number N path points (e.g., N=7, although other numbers may be used). Either at least $N_{Stair}$ stair gait classifications in the same direction (e.g., $N_{stair}$=4, although other values may be used) or $N_R$ steps with continuously changing elevation (e.g., $N_R$=6, although other values may be used) proportional to riser height and $N_{MinStair}$ gait classifications (e.g., $N_{MinStair}$=2, although other values may be used) in the same direction may be used to start a stairwell. The x, y, and z locations, Gait, Gyro Heading, Compass angle, Time, and/or other sensor information at each path point may be provided to feature detection module 310.

In an operation 1104, a determination of whether a stairwell is in progress may be made. If a stairwell is in progress, a determination of whether a state is set to "stairwell continue" may be made in an operation 1106. If the state is not set to "stairwell continue," a determination of whether the state is set to "accumulate" may be made in an operation 1108. If the state is set to "accumulate," N path points (e.g., three path points, although other numbers may be used) may be accumulated in a landing buffer and the state may be set to "landing continue" in an operation 1110.

Returning to operation 1104, if a stairwell is not in progress (e.g., a state is set to "stairwell not in progress"), processing may proceed to an operation 1112, where the most recent N path points (e.g., 7 path points, although other numbers may be used as well) may be processed (referring now to FIG. 11B).

In an operation 1114, a determination of whether stairwell criteria are met may be made. The stairwell criteria may be met when: (i) there exists at least a particular number of stair gait classifications ($N_{Stair}$) in the same first direction and/or (ii) the elevation change between each step indicates that all N steps are changing elevation proportional to a riser height and going in the same direction and there are at least a particular number of stair gait classifications in the same first direction ($N_{MinStair}$). If the stairwell criteria are met, a flight in the first direction may be started/recognized and the state of the system may be changed to "stairwell continue" in an operation 1116.

Returning to operation 1106 (illustrated in FIG. 11A), if the state of the system is "stairwell continue," a determination of whether a step (e.g., as determined by a current path point) of a flight of stairs is in progress and in the same direction as a previous step (e.g., as determined by a previous path point) of the flight of stairs may be made in an operation 1118 (referring now to FIG. 11B).

The step may be determined to be in the same direction as the previous step: (i) if the heading of the current path point is within, for example, 90 degrees of the heading of the previous path point and/or (ii) if the current path point is a stair gait classification or has an elevation equal to a riser height in the same direction as the flight in progress.

If the step of a flight of stairs is in progress and in the same direction as a previous step of the flight of stairs, the path point may be included in the flight of stairs in progress in an operation 1120. Otherwise, the state of the system may be changed to "accumulate" and the flight is paused at the last path point in an operation 1122.

Returning to operation 1108 (illustrated in FIG. 11A), if the state is not set to "accumulate," a determination of whether the state is "landing continue" may be made in an operation 1124 (referring now to FIG. 11C).

If the state is "landing continue," a determination of whether to end the stairwell may be made in an operation 1126, continue the current flight may be made in an operation 1130, create a new flight may be made in an operation 1134, or create partial flight may be made in an operation 1138, otherwise if the state is not "landing continue", processing may return to 11A. The determination of whether to end the stairwell may be based on the distance between the current path point and the last flight path point. For example, if the distance between the current path point and the last flight path point is more than D meters (e.g., D=2, although other numbers may be used as well), then the flight and the stairwell in progress may be ended, corresponding flight and stairwell messages may be generated, and the state of the system may be changed to "stairwell not in progress" in an operation 1128.

Returning to operation 1126, if the stairwell is not to be ended, a determination of whether the current flight is to be continued may be made in an operation 1130. The determination may be based on an elevation difference between each landing step, which may be calculated in operation 1130. If the majority of the path points in the landing buffer are: (i) stair classifications or changing elevation in the direction of the flight in progress and (ii) average heading of a few last landing path point is within a threshold value such as 90 degrees of the heading of the flight in progress, the landing steps in the flight may be included in the current flight in progress and the state of the system may be changed to "stairwell continue" in an operation 1132.

If the current flight is not to be continued, a determination of whether a new flight should be created may be made in an operation 1134. If the majority of the path points in the landing buffer are: (i) stair classifications or changing elevation in the direction of the flight in progress and (ii) average heading of a few last landing path points is outside a threshold value such as 90 degrees of the heading of the flight in progress, the flight in progress may be ended, corresponding flight message may be generated and a new flight may be started in an operation 1136. The new flight may be started at the landing path point from where all the successive points are either stair classifications or changing elevation in the same direction as the direction of the past flight. Also in operation 1136, the flight transition angle between the new flight end and the old flight may be calculated the state of the system may be changed to "stairwell continue."

If a new flight should not be created, a determination of whether to create a partial flight may be made in an operation 1138. If the majority of the path points in the landing buffer are stair classifications or changing elevation in the opposite direction of the flight in progress, a partial flight may be created, the direction of the flight may be changed, and the state may be changed to "stairwell continue" in an operation 1140.

As described herein, whenever a flight ends, the stairwell parameters may be updated and the flight message may be provided. According to an aspect of the invention, stairwell parameters that are updated include stairwell configuration and winding direction. For the first flight of the stairwell, it is passed through feature detection module 310, which determines whether the stairwell is straight or radial. The radial stairwell detector also determines the up winding of the stairwell. If the configuration is straight, the up winding is none. If the configuration is radial, the up winding can be clockwise or counter-clockwise. For every successive flight, stairwell configuration and up winding are determined based on the last flight transition angle. Whenever a stairwell ends, the stairwell message may be provided and the state of the system may be changed to "stairwell not in progress."

Extended Feature Messages

Figure 13:
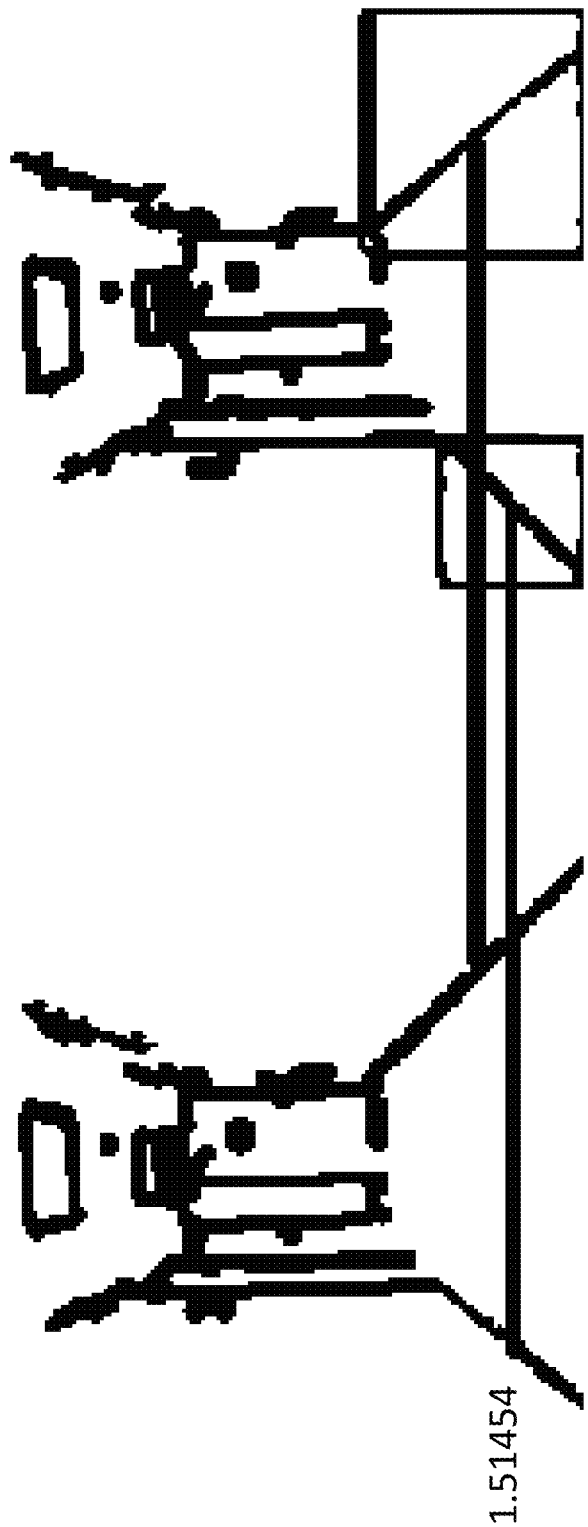
FIG. 13 is an exemplary illustration of an optical hallway width estimation results based on line detection, according to an aspect of the invention.

According to an aspect of the invention, feature detection module 310 may be configured to combine different types of sensor features to enhance recognition of a feature and more uniquely correlate such features with a structural feature. For example, feature detection module 310 may correlate inertial sensor features and/or inertial sensor measurements with a hallway in a building. Feature detection module 310 may enhance the correlation by combining the inertial sensor features and/or inertial sensor measurements with other types of sensor features/sensor information such as optical features/information. For example, FIG. 13 is an exemplary illustration of optical hallway width estimation results based on line detection, according to an aspect of the invention. In this example, the detected width of the hallway is 1.61 meters. The actual width of the hallway is approximately 1.52 meters. Other sensors 116 (illustrated in FIG. 1) such as a Light Detection And Ranging ("LIDAR") sensor may be used to provide similar information.

Transition Detection

According to an aspect of the invention, a location transition detection module 330 may be configured to identify transitions between different locations such as indoor and outdoor transitions. The detected transitions from structured (such as indoors, in caves, etc.) to unstructured (such as outdoor) environments (or vice versa), may be used to improve tracking, and/or provide an additional structural feature for mapping and corrections of the location estimate upon revisiting the transition. Various signals may be used for transition detection individually or in combination. Examples of such signals include GPS signal quality, magnetic signature, electrical signature (the predominant frequency of power—in the US 60 Hz, for example—may be detected upon entering a structure), and/or lighting. According to an aspect of the invention, map information may be used for transition detection.

Each indicator may be associated with some level of uncertainty. Thus, location transition detection module 330 may use a combination of sources to determine transition locations. For example, an indicator that is independent of GPS may be used in situations where GPS has been inadvertently or intentionally jammed.

According to an aspect of the invention, tracking system 110 may be used as a transition detector (e.g., one or more processors of a tracking system may be programmed by location transition detection module 330). According to an aspect of the invention, algorithm parameters and thresholds may be selected that yield the best results based on available sensors. According to an aspect of the invention, slight variations to these elements may result in an indoor/outdoor indicator that may be tuned to a specific environment.

According to an aspect of the invention, using sensors on the tracking system, location transition detection module 330 may be configured to determine the indoor/outdoor status (indoor/outdoor/unknown) of the trackee.

The sensors may include a GPS receiver capable of receiving NMEA GSV messages, a 3-axis magnetometer, and a light sensor capable of detecting light in both the visible and infrared spectrum.

According to an aspect of the invention, location transition detection module 330 may be configured to determine one or more confidence values that indicate the likeliness that a trackee is located outdoors (or indoors). Different confidence values may be used for different types of sensors being used. An outdoor or indoor determination may be made based on the confidence values. Such determination may partially or fully occur at the tracking system 110, a command station such as computer 120, and/or other device that can obtain the confidence values.

Tracking system 110 may include an indoor/outdoor processor that handles incoming data at differing rates. Exemplary data rates and sensors used within the tracking system are provided in Table 1:

TABLE 1

| Tracking System Sensors | | | |
|---|---|---|---|
| GPS | Fastrax IT520 | 1 | NMEA GSV |
| Light Sensor | Avago APDS-9300 | 40 | Visible + IR Irradiance |
| Magnetometer | HMC5883L | 40 | X, Y, Z (gauss) |

GPS Indicator

Two unique algorithms may be used to determine indoor/outdoor status using GSV messages alone. The first algorithm (Elevation/CNR) determines a confidence value from satellites with a minimum carrier-to-noise ratio (CNR) that are considerably overhead. When outdoors one should see a number of satellites overhead. The satellites closer to the horizon can often be seen from indoors near windows. The second algorithm (CNR Ratio) considers all visible satellite CNRs in order to determine an indoor/outdoor confidence. The GPS satellite signal is very weak and buildings will further reduce the signal relative to the noise floor so having a higher CNR is an indication of being outdoors.

Elevation/CNR

This algorithm takes into account the satellites that are overhead based on their elevation. Typically, as users enter buildings, fewer satellites will be visible overhead and those satellites will have a lower CNR. According to an aspect of the invention, various criteria may be used to determine an indoor/outdoor status. Examples of criteria may include: (1) The total number of GSV messages received being greater than a threshold number such as 5; (2) The total number of satellites tracked being greater than a threshold number such as 5; (3) and/or at least one satellite having a CNR greater than a threshold value such as 0.

The output may be computed as a sum of each selected (e.g., elevation>30 degrees, CNR>20) satellite's contribution weighted by its elevation and multiplied by a scaling factor such as 100.

In Equation (2), $x_i(k)$ denotes the elevation above the horizon (90 degrees overhead) of satellite i at time index k, and $w_i(k)$ is its signal strength (CNR) at that time.

According to an aspect of the invention, the Elevation/CNR confidence, y(k), is given by the equation:

$$y(k) = \frac{\sum_{i \in P_k} x_i(k)^3}{\sum_{i \in R_k} x_i(k)^3} * 100 \quad (2)$$

wherein:
$S_k$={all available satellites at time k},
$R_k$={i∈$S_k$|$x_i(k)$>30 degrees},
$P_k$={i∈$S_k$|($x_i(k)$>30 degrees) & ($w_i(k)$>20)}.

The output confidence may include a number between 0 and 100. Higher values may indicate a higher probability of being outdoors. Numbers close to zero may indicate that the user is inside. This indicator is often delayed by approximately 15 seconds (or other duration), due a hysteresis effect often observed directly around buildings.

CNR Ratio

This algorithm may use the CNR values for all currently visible satellites. As with the Elevation/CNR algorithm, a criteria used to determine an indoor/outdoor status may include the total number of GSV messages received being greater than a threshold number, such as 5.

Since this algorithm has fewer criteria, it may not experience as much of a hysteresis effect when near buildings.

The confidence value may be determined by examining the ratio of strong CNR satellites (e.g., CNR>25, although other values may be used) to weak CNR satellites (e.g., CNR>10, although other values may be used).

The ratio is then multiplied by a scaling factor such as 100.

$w_i(k)$ may denote the CNR of satellite i at time index k.

According to an aspect of the invention, THE CNR Ratio confidence, y(k), is given by the equation:

$$y(k) = \frac{\sum_{i \in R_k} 1}{\sum_{i \in P_k} 1} * 100 \quad (3)$$

wherein:
$S_k$={all available satellites at time k}
$R_k$={i∈$S_k$|$w_i(k)$>25}
$P_k$={i∈$S_k$|$w_i(k)$>10}.

Combined Confidence

According to an aspect of the invention, location transition detection module 330 may be configured to determine a single confidence value for the GPS sensor by averaging the results of both the Elevation/CNR confidence and the CNR Ratio confidence, which may decrease the transition hysteresis time (due to the CNR Ratio) and increase long term stability (due to the Elevation/CNR). The confidence value is then scaled to between 0 and 255 to provide the highest resolution in a single byte.

According to an aspect of the invention, GPS sensor information may be degraded based on weather conditions which can affect GPS reception, when the tracked subject has not placed a GPS antenna in a good location (e.g., in pocket signal strength may already be deteriorated), when the tracked subject is in an urban canyon where satellites are blocked on one or both sides for extended periods before transition, when the tracked subject is in a building near large open window or within a building where construction materials do not completely block GPS (e.g., sometimes on the top floor of a house GPS signal strength is adequate), when the tracked subject is under heavy canopy, and/or other situations where the GPS signal may be degraded.

Light Sensor Indicator

According to an aspect of the invention, a light sensor of the tracking system may provide an indicator of a user's indoor/outdoor status.

According to an aspect of the invention, the light sensor may detect the irradiance of visible and IR light through a translucent case of the tracking system. In the default configuration, the sensor provides a value between 0 and 65535, with higher numbers indicating more light.

A summary of exemplary values for the sensor are provided in Table 2. During the day, even in poor weather conditions, the light sensor may provide a clear indication of that the sensor is outdoors when the sensor values are greater than 1000.

Table 2

TABLE 2

| Light Sensor Typical Values | | | |
| --- | --- | --- | --- |
| Inside | Day | N/A | 0-100 |
| Inside | Night | N/A | 0-100 |
| Outside | Day | Sunny | 10000-15000 |
| Outside | Day | Cloudy | 1000-10000 |
| Outside | Night | N/A | 0-100 |

Since the light sensor results vary based on the time of day and the weather conditions, both a filter and confidence algorithm may be used. In this aspect, light sensor values are available at 40 Hz. In order to conserve memory, the light sensor confidence is only calculated at 1 Hz (or other frequency), synchronized with the GPS signal. As sensor information is received at 40 Hz, location transition detection module 330 may be configured to calculate the mean over the last 40 (or other number of) samples, the maximum over the past 32 seconds (or other time period), and the overall maximum sensor value.

For example, w(k) may denote the mean of the last 40 light sensor values at time index k in Equation (4).

According to an aspect of the invention, the confidence, y(k), is given by the equation:

$$y(k) = \begin{cases} 255 & w(k) > r(k) \\ \frac{w(k) - \frac{p(k)}{3}}{r(k) - \frac{p(k)}{3}} * 255 & w(k) > \frac{p(k)}{3} \\ 0 & \text{otherwise} \end{cases} \quad (4)$$

w(k)={mean of last 40 light sensor values}
r(k)=max({w(x): x=1, . . . , k}, 1000)
p(k)=max({w(x): x=k−31, . . . , k})

The confidence value, y(k), may range from 0 to 255 with higher values indicating that the user is more likely outside.

Magnetic Indicator

According to an aspect of the invention, location transition detection module 330 may use the magnitude of the output of a 3-axis magnetometer. As a user is moving, the variance of the magnitude of the magnetometer signal is considerably lower when outside and farther away from buildings. Inside of buildings, especially those containing metal framing and many sources of magnetic interference, the variance of the magnetometer may be considerably larger than when outside in the middle of a field or parking lot. According to an aspect of the invention, location transition detection module 330 may be configured to ignore times when the user is stationary because the magnetic field may not fluctuate when the user is stationary, causing a false positive indicator that the user is outside.

Figure 14:
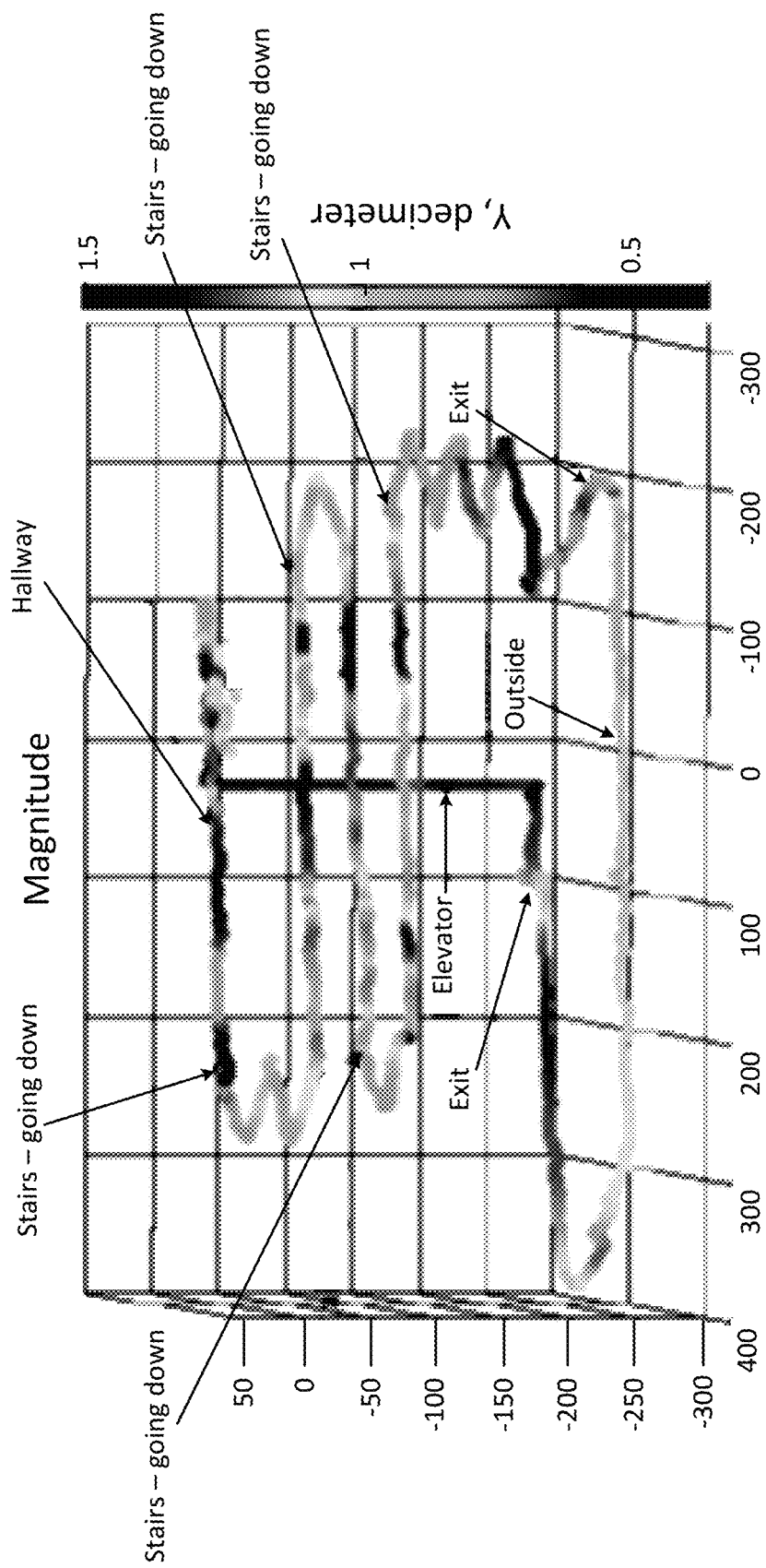
FIG. 14 is an exemplary illustration of a 3-Dimensional location with magnetic field magnitude coded in grey scale along the course, according to an aspect of the invention.

FIG. 14 is an exemplary illustration of a 3-Dimensional location with magnetic field magnitude coded in grey scale along the course, according to an aspect of the invention. The Figure illustrates magnetic field magnitude changes in different parts of a high-rise building. The measured values remained consistent over different re-runs of the same path. The magnetic field magnitude is normalized so that it would be 1 (light grey on the scale of the figure) when measuring only the earth's magnetic field. The course traversed by the trackee includes a segment between the indicated exits (illustrated in FIG. 14 as "Exit") that is outside while the remainder of the course is inside of the building. For the segment that indicates traversal outside of the building, the magnetic field magnitude is about 1 and relatively constant. The magnetic field inclination also varies more indoors (albeit not as reliably) and may also be used as an indicator.

Figure 15:
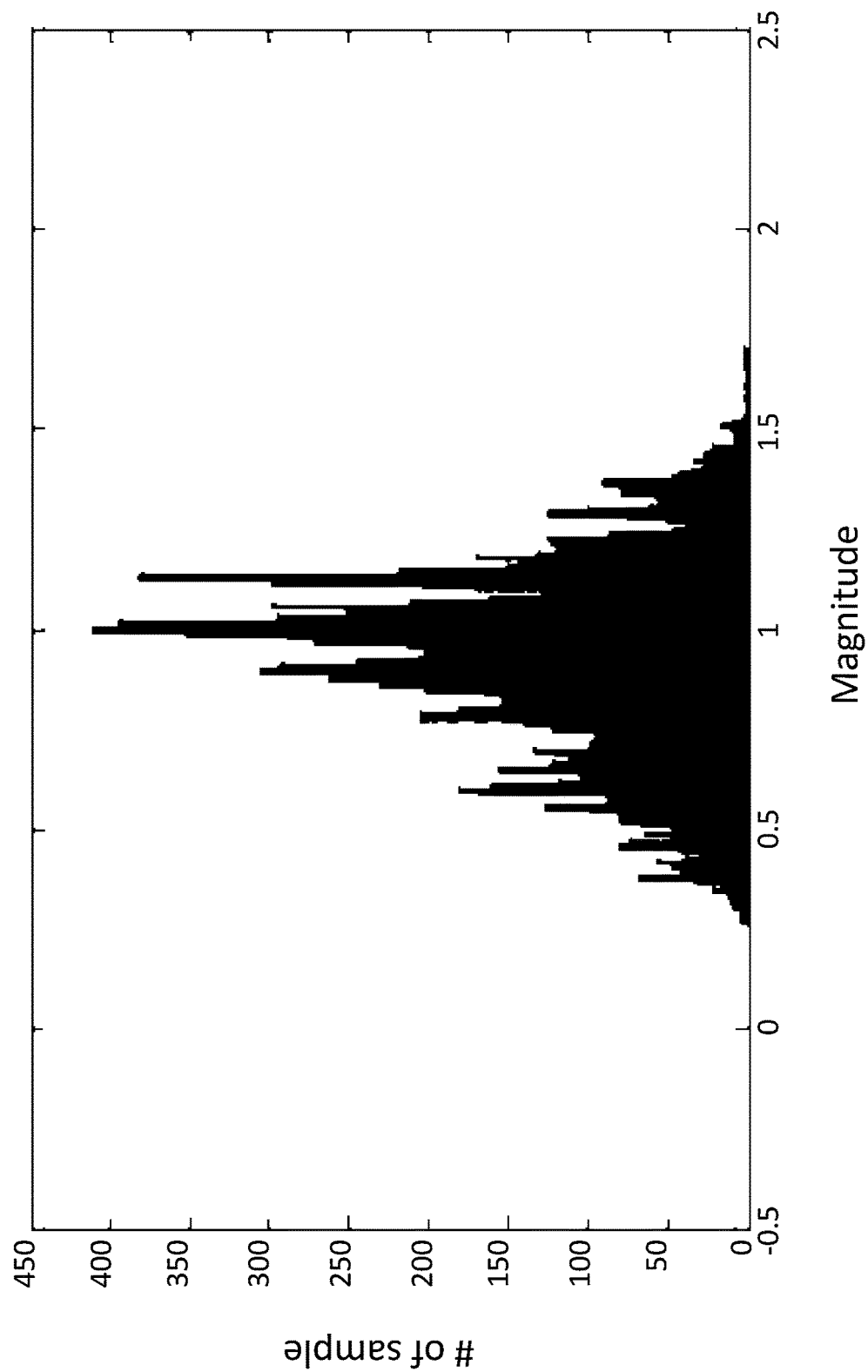
FIG. 15 is an exemplary illustration of a histogram of magnetic field magnitude values for the course illustrated in FIG. 14, according to an aspect of the invention.

FIG. 15 is an exemplary illustration of a histogram of magnetic field magnitude values for the course illustrated in FIG. 14, according to an aspect of the invention.

Figure 16:
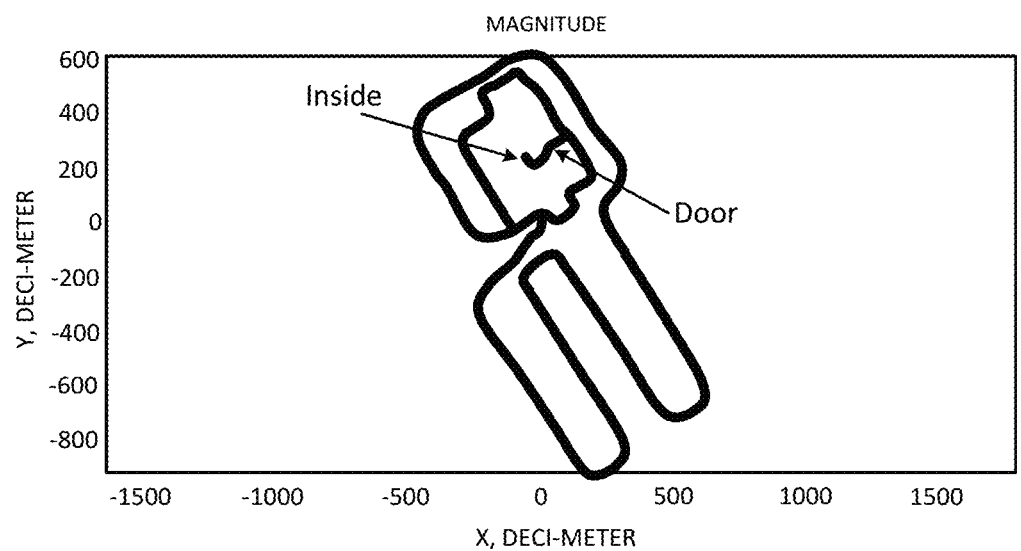
FIG. 16 is an exemplary illustration of a 2-Dimensional location over a relatively flat course, according to an aspect of the invention.

FIG. 16 is an exemplary illustration of a 2-Dimensional location traversed over a relatively flat course, according to an aspect of the invention. The portion of the course from the indicated "Door" to "Inside" is inside, while other illustrated portions of the course are outside. The smaller square is a path taken outside but very close to the building, the outer loop is far enough that building does not have much effect. Magnetic field magnitude is coded in grey scale along the track using the same scale as above. Again the magnetic field magnitude is normalized so that it would be 1 (light grey on the scale of the figure) when measuring only the earth's magnetic field. Note that when outside the magnetic field magnitude is about 1 and relatively constant when away from the building. Nearer to the building there is more variation in the field values.

Figure 17:
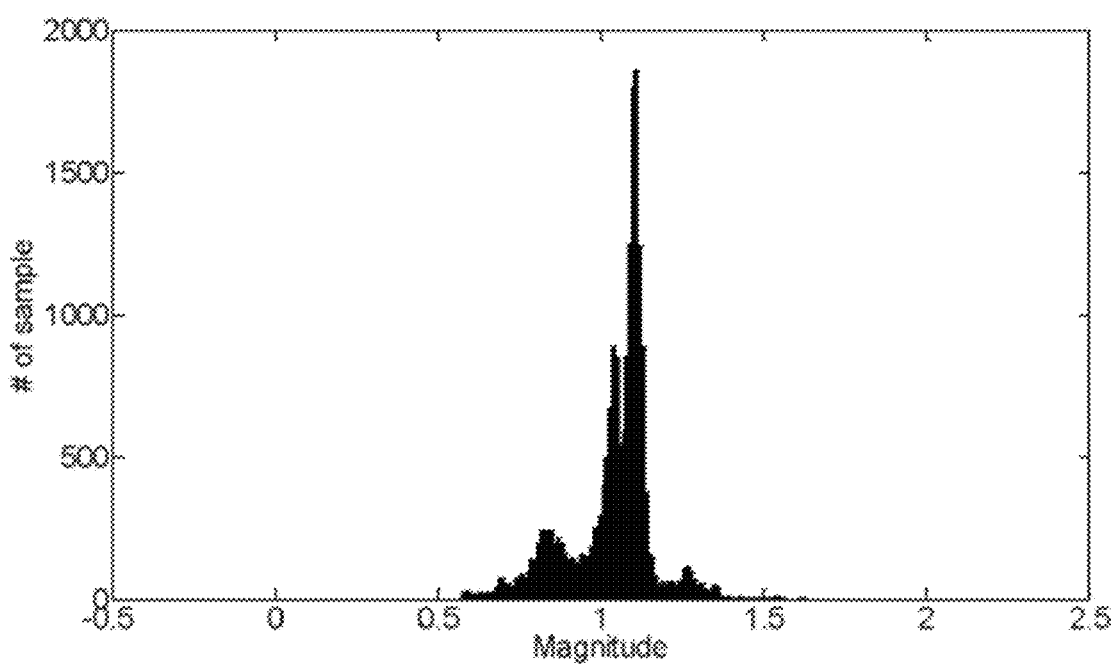
FIG. 17 is an exemplary illustration of a histogram of magnetic field magnitude values for this mostly outdoor course, according to an aspect of the invention.

FIG. 17 is an exemplary illustration of a histogram of magnetic field magnitude values for this mostly outdoor course, according to an aspect of the invention. Note that the variation is less than seen on the indoor course.

Based on the foregoing, there is a difference in the magnetic field properties inside and outside of the building. According to an aspect of the invention, mapping application 130 may be configured to determine the variation in magnetic field and use the fact that inside the building the magnetic field varies much more quickly as a function of location for transition detection.

Various implementations of transition detection are described below. As with the light sensor values, the magnetometer values are reported at 40 Hz, although other frequencies may be used as well.

Figure 18:
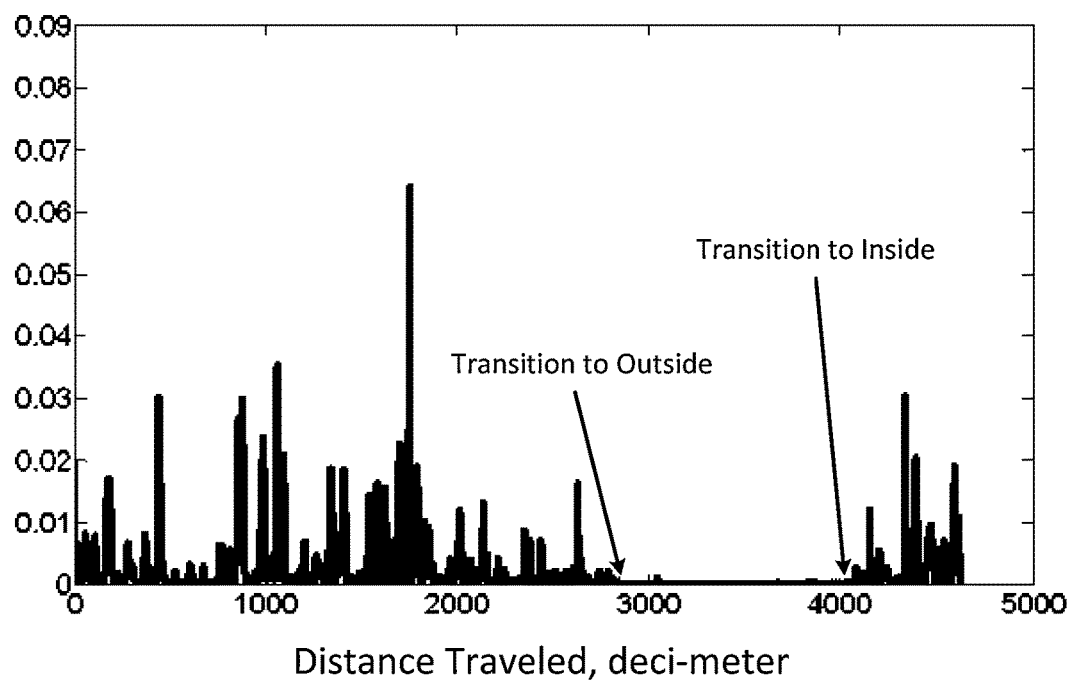
FIG. 18 is an exemplary illustration of a histogram of magnetic field values for the path illustrated in FIG. 14, according to an aspect of the invention.
Figure 19:
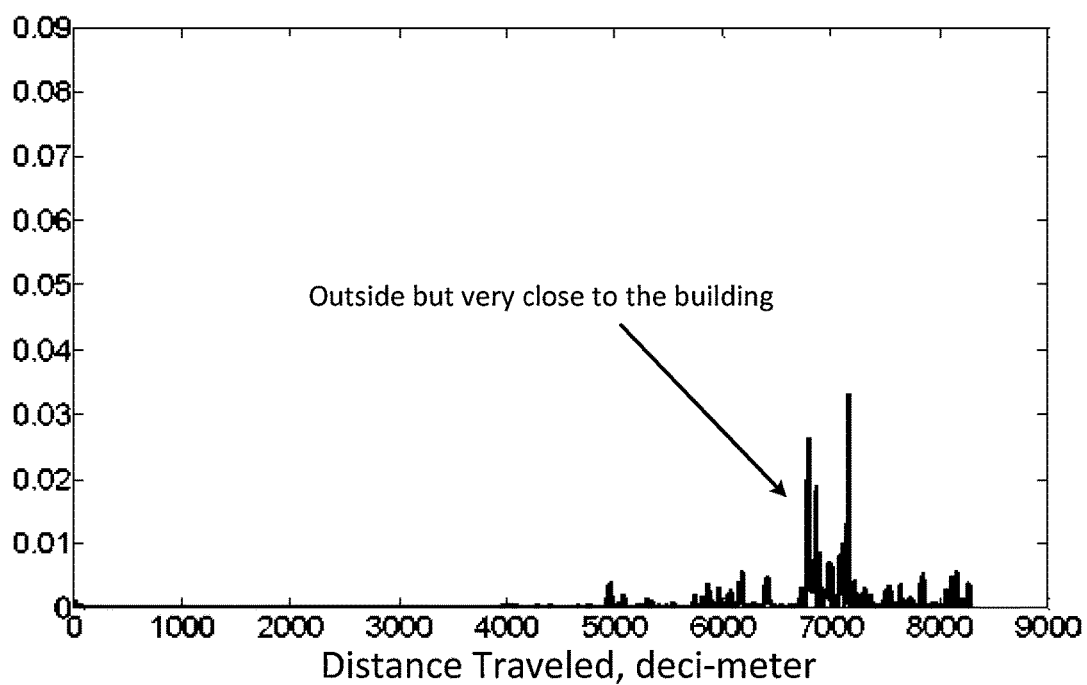
FIG. 19 is an exemplary illustration of a histogram of magnetic field values for the path illustrated in FIG. 16, according to an aspect of the invention.

According to an aspect of the invention, magnetic magnitude variance over a sliding historical window (when the user is moving, e.g., the user's location is changing) may be used as a metric to detect indoor/outdoor transition. This magnetic magnitude variance may be significantly smaller outdoors than indoors. According to an aspect of the invention, location transition detection module 330 may be configured to detect a transition feature when the magnetic magnitude variance crosses a threshold for particular length of time. However, when very close to the building but still outside the magnetic magnitude variance may not give accurate results. FIGS. 18 and 19 illustrate this metric plotted for the paths described above.

FIG. 18 is an exemplary illustration of a histogram of magnetic field values for the path illustrated in FIG. 14, according to an aspect of the invention.

FIG. 19 is an exemplary illustration of a histogram of magnetic field values for the path illustrated in FIG. 16, according to an aspect of the invention.

According to an aspect of the invention that is tuned for embedded computation, location transition detection module 330 may be configured to, given a fixed buffer length N+M, for the M prior samples in which the user was moving, compute the difference of the magnetic field magnitude at sample i, denoted |H(i)|, with the magnetic field magnitude at sample i−N, denoted |H(i−N)| according to the equation:

$$\Delta(i)=|H(i)|-|H(i-N)| \quad (5)$$

wherein

|H(i)| is the magnetic field magnitude at sample i,

|H(i−N)| is the magnetic field magnitude at sample i−N,

If there are no magnetic disturbances, the difference may be expected to be very near zero. In this aspect of the invention, the sampling frequency may be 40 Hz, M may be 200 (5 seconds of data), and N may be 32, although other values may be used as well (this amounts to sampling—possibly non-uniformly as a function of travel speed—the spatial variation in magnetic field).

To compensate for the size of the spatial sampling interval, location transition detection module 330 may be configured to consider $\Delta/d$, where d is distance traveled.

According to an aspect of the invention, location transition detection module 330 may be configured to count the number of outliers for the sequence $\{\Delta(i): i=1 \ldots M\}$. An outlier may be defined, for example, as a $\Delta(i)$ where $\Delta(i)$ is greater than N times the standard deviation of a nominal data set where magnetic magnitude data was collected in an open area mostly free of magnetic anomalies. In this aspect of the invention, an outlier is defined as a point in which the magnitude difference was greater than 0.03, although other magnitude difference values may be used.

The indicator $K \in [0,1]$ is the number of outliers divided by M.

Fewer outliers may be present outdoors. As such, outdoors, K may be nearer to zero than to 1. More outliers may be present indoors. As such, indoors K may be nearer to 1 than to zero. Because of the window length over which the computation takes place, a steady decline in the indicator value to near 0 as a person exits a building and a steady increase in the indicator value to near 1 when a person enters a building may be expected.

According to an aspect of the invention, K may be computed at each new measurement or after some number (L) of new samples. In this aspect, the indicator may be computed after L=100 new samples (e.g., 40 Hz sampling after 2.5 seconds), although other values may be used. A threshold, which is a function of L, can then be used to determine the transition time and location.

As noted above, it may be important to ignore times when the user is stationary since, at those times, the magnetic field will not fluctuate and may give a false positive indicator of being outdoors. In some aspects of the invention, the definition of user motion is left open.

In another aspect of the invention, user motion may be specifically defined by a pseudo speed and magnetic field may only be considered for points where the pseudo speed is greater than a threshold value.

In this aspect of the invention, also tuned for embedded computation, location transition detection module 330 may be configured to calculate the mean and variance of the magnetometer as well as the mean of the pseudo speed determined using the mean of the magnitude of the accelerometer.

The pseudo speed may be determined using the following Equation. The pseudo speed, s(k), is given by the equation:

$$s(k) = \frac{\sum_{n=k-20}^{k} \begin{cases} r(n) & r(n) \geq 40 \\ 0 & \text{otherwise} \end{cases}}{5985} \quad (6)$$

wherein:
r(n)={acceleration magnitude at time index n (mg)}

The magnetometer confidence is then determined by the following. The confidence, y(k), is given by the equation:

$$y(k) = \begin{cases} 0 & m(k) > 1 \text{ or } m(k) < 0 \\ 0 & s(k) < 0.9 \text{ or } v(k) > 2.5 \cdot 10^{-6} \\ \frac{2 \cdot 255}{v(k) \cdot 10^6} & \text{otherwise} \end{cases} \quad (7)$$

wherein:
s(k) denotes the mean of the last 40 (or other number of) speed calculations,
m(k) denotes the mean of the last 40 (or other number of) magnetometer magnitudes, and
v(k) denotes the variance of the last 40 magnetometer values.

The confidence value, y(k), is then bounded between 0 to 255, for example, with higher values indicating that the user is more likely outside.

Figure 20:
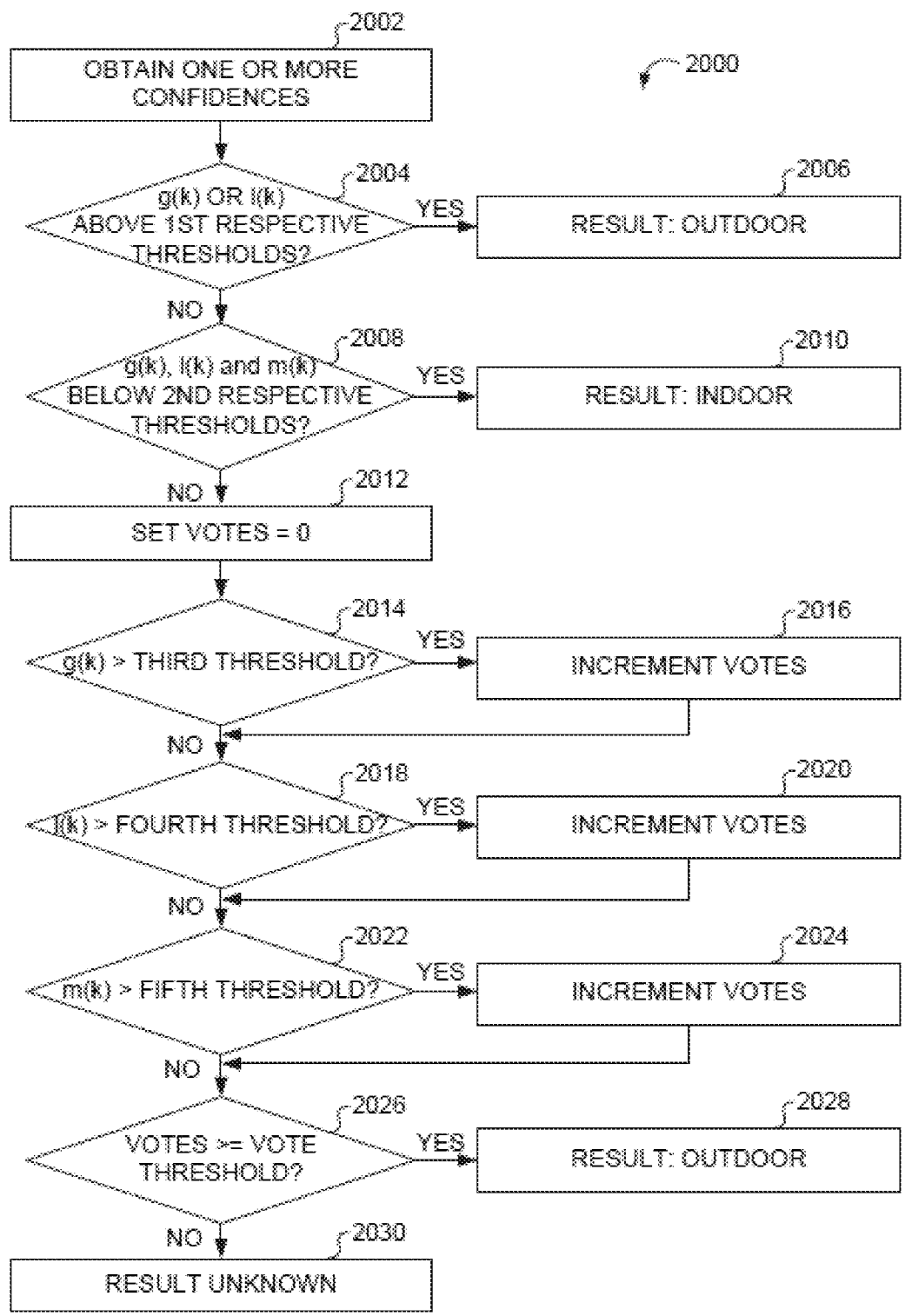
FIG. 20 is an exemplary illustration of various processing operations of a process for determining an indoor/outdoor status, according to an aspect of the invention.

FIG. 20 is an exemplary illustration of various processing operations of a process 2000 for determining an indoor/outdoor status, according to an aspect of the invention. The various processing operations depicted in the flowchart of FIG. 20 are described in greater detail herein. The described operations may be accomplished using some or all of the system components described in detail above. For example, location transition detection module 320 may be configured to perform some or all of the operations of process 2000.

According to an aspect of the invention, various operations may be performed in different sequences. In other implementations, additional operations may be performed along with some or all of the operations shown in FIG. 20, or some operations may be omitted. In yet other implementations, one or more operations may be performed simultaneously. Accordingly, the operations as illustrated (and described in greater detail below) are exemplary in nature and, as such, should not be viewed as limiting.

In an operation 2002, one or more confidences for one or more types of sensor information may be obtained. For example, GPS, light, magnetometer, and/or other types of confidences (which may be between, for example, 0 and 255) may be received at a constant rate at a command station. Generally speaking, a final overall confidence value of indoor/outdoor status may be determined based on thresholds and voting.

As illustrated in FIG. 20:
g(k) denotes a GPS confidence at time index k,
l(k) denotes a light confidence at time index k, and
m(k) denotes a magnetometer confidence at time index k.
Other numbers and types of sensor confidences may be used as well.

In an operation 2004, a determination of whether the GPS confidence meets/exceeds a first GPS confidence threshold (e.g., 125, although other thresholds may be used) or the light confidence meets/exceeds a first light confidence threshold (e.g., 50, although other thresholds may be used) may be made. If either or both exceed their respective thresholds, a determination that the trackee is outdoors may be made in an operation 2006. High GPS confidence may indicate that there are satellites visible overhead (greater than some number of degrees from the horizon) with high CNR (e.g., above a threshold value) and the radio of all visible satellites with high CNR is a large proportion (e.g., greater than a threshold proportion) of the number of visible satellites. These are both good indicators of being outdoors since buildings or other structures will typically block visibility of overhead satellites, and when they are not fully blocked, their CNR will be low because of the attenuation cause when the signals penetrate the structure. Additionally, the high light confidence indicates the lighting is very bright, which may be an independent indicator that the sensor is outdoors. In cases where one sensor gives a clear indication, trusting a single sensor is appropriate since, for example, at night, outdoors, the GPS indicator may indicate that the sensor is outdoors but the lighting at night provides little value. On the other hand, in situations where GPS is jammed or is otherwise unavailable or diminished such as in heavy forest canopy, the light sensor may provide an indication that the user is outdoors but the GPS sensor provides little value.

On the other hand, if the GPS confidence does not exceed the first GPS confidence threshold and the light confidence does not exceed the first light confidence threshold, a determination of whether: (i) the GPS confidence is equal to or below a second GPS confidence threshold (e.g., 0, although other thresholds may be used), (ii) the light confidence is equal to or below a second light confidence threshold (e.g., 5, although other thresholds may be used), and (iii) the magnetometer confidence is equal to or below a first magnetometer confidence threshold (e.g., 0, although other thresholds may be used) may be made in an operation 2008.

If the GPS, light, and magnetometer confidences are all below their respective thresholds, a determination that the trackee is indoors may be made in an operation 2010. The navigation engine may begin to impose restrictions/corrections to the possible paths in structured indoor environments, as such it is important not to give a false indication that the sensor is indoors. The sensors may each provide values below threshold when still outdoors, for example, GPS in heavy canopy, the light sensor at night, and the magnetic sensor around magnetic anomalies. As such, making a determination that the trackee/sensor is indoors may be made more trustworthy when information from multiple sensors are in agreement.

On the other hand, if the GPS, light, and magnetometer confidences are not all below their respective thresholds, then the number of votes may be set to zero in an operation 2012 (although another baseline number of votes may be set as well).

In an operation 2014, a determination of whether the GPS confidence exceeds a third GPS threshold (e.g., 40, although other thresholds may be used) may be made. If the GPS confidence exceeds the third GPS threshold, the number of votes may be incremented (e.g., by one) in an operation 2016.

In an operation 2018, a determination of whether the light confidence exceeds a third light threshold (e.g., 15, although other thresholds may be used) may be made. If the light confidence exceeds the fourth (light) threshold, the number of votes may be incremented (e.g., by one) in an operation 2020.

In an operation 2022, a determination of whether the magnetometer confidence exceeds a fifth (magnetometer) threshold (e.g., 10, although other thresholds may be used) may be made. If the magnetometer confidence exceeds the fifth (magnetometer) threshold, the number of votes may be incremented (e.g., by one) in an operation 2024.

In an operation 2026, if the number of votes meets/exceeds a vote threshold (e.g., 2, although other thresholds may be used), then a determination that the trackee is outdoors may be made in an operation 2028. Otherwise, a determination that the indoor/outdoor status is unknown may be made in an operation 2030.

Results

Figure 21:
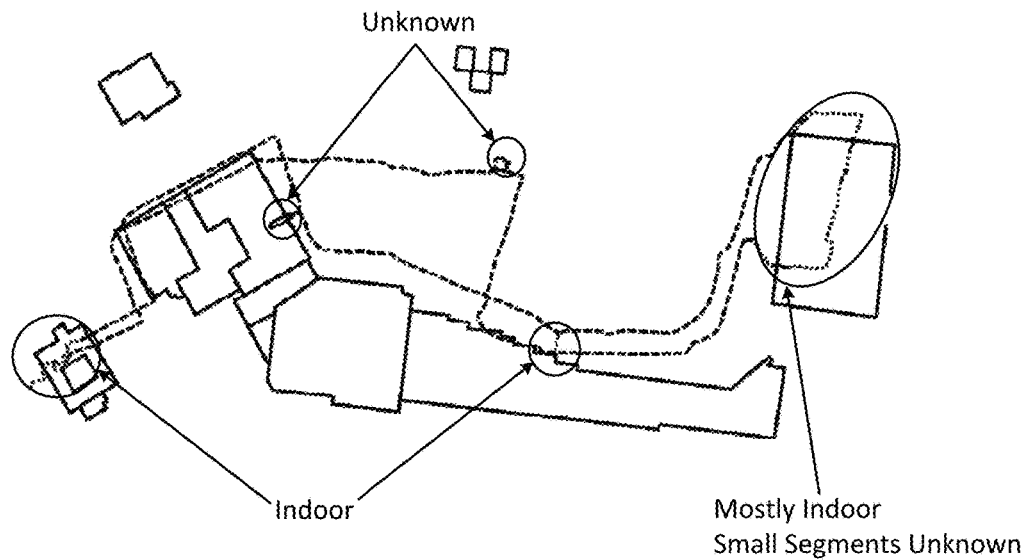
FIG. 21 is an exemplary illustration of a path taken for which the indoor/outdoor status was determined, according to an aspect of the invention.

FIG. 21 is an exemplary illustration of a path taken for which the indoor/outdoor status was determined, according to an aspect of the invention.

Results are shown using the described GPS indicator, light indicator and the magnetic indicator. The user started in an office building, walked around a shopping center and entered a restaurant. The user then traveled to a grocery store and several small shops within the shopping center before returning to the office building. The final indicator is able to able to determine when the user is outside (e.g., portions of the path that is not circled) with a high confidence. When inside of buildings, the location of the user was either determined to be indoors or unknown.

Figure 22:
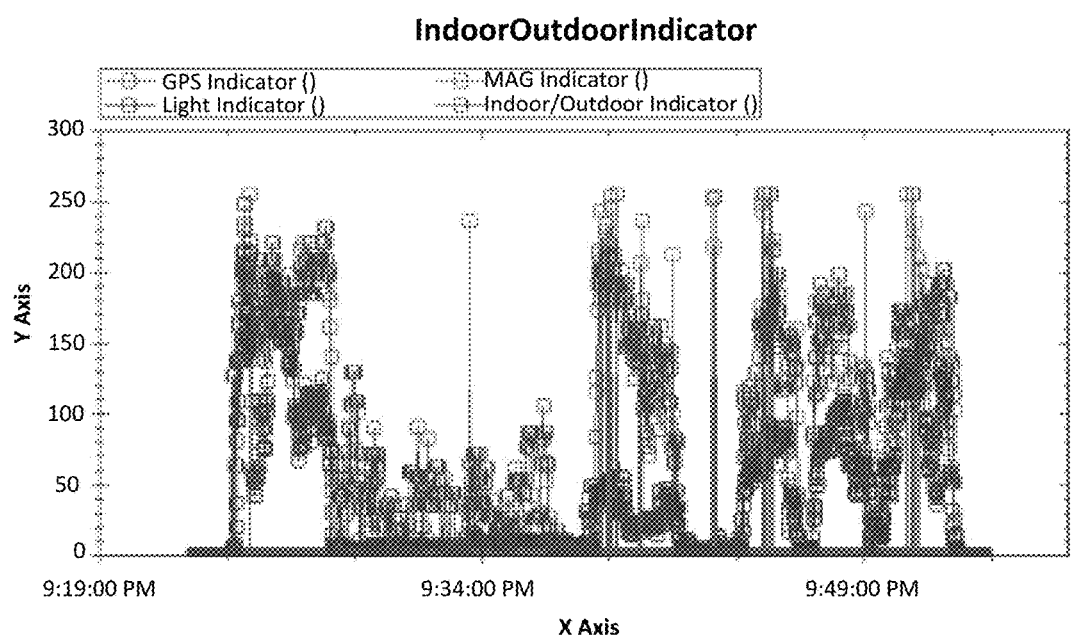
FIG. 22 is an exemplary illustration of the confidence signals for GPS, light, and the magnetometer for the path in FIG. 21 plotted against time, according to an aspect of the invention.

FIG. 22 is an exemplary illustration of the confidence signals for GPS, light, and the magnetometer for the path in FIG. 21 plotted against time, according to an aspect of the invention. Between sunrise and sunset, GPS and light confidences follow a similar trend, and the magnetometer is useful when neither the GPS nor the light sensors are able to produce a large enough confidence.

Vehicle Transition Detection

According to an aspect of the invention, vehicle transition detection module 340 may be configured to identify transitions from pedestrian motion to vehicular motion of the tracked subject (and vice versa) so that different tracking operations may be performed depending on whether the trackee is travelling on foot or in a vehicle. For example, vehicular motion may be tracked with good accuracy using GPS data and therefore such data may be relied upon more so when the trackee is determined to be travelling in a vehicle.

According to an aspect of the invention, the vehicle transition detection module 340 is used to enable the navigation system to switch tracking algorithms when a transition is detected between traveling in a vehicle and traveling on foot. In this aspect, vehicle transition detection module 340 is used to switch from pedestrian tracking algorithms when it is determined that the subject is traveling on foot, and to GPS tracking when it is determined that the subject is traveling in a vehicle.

Figure 23:
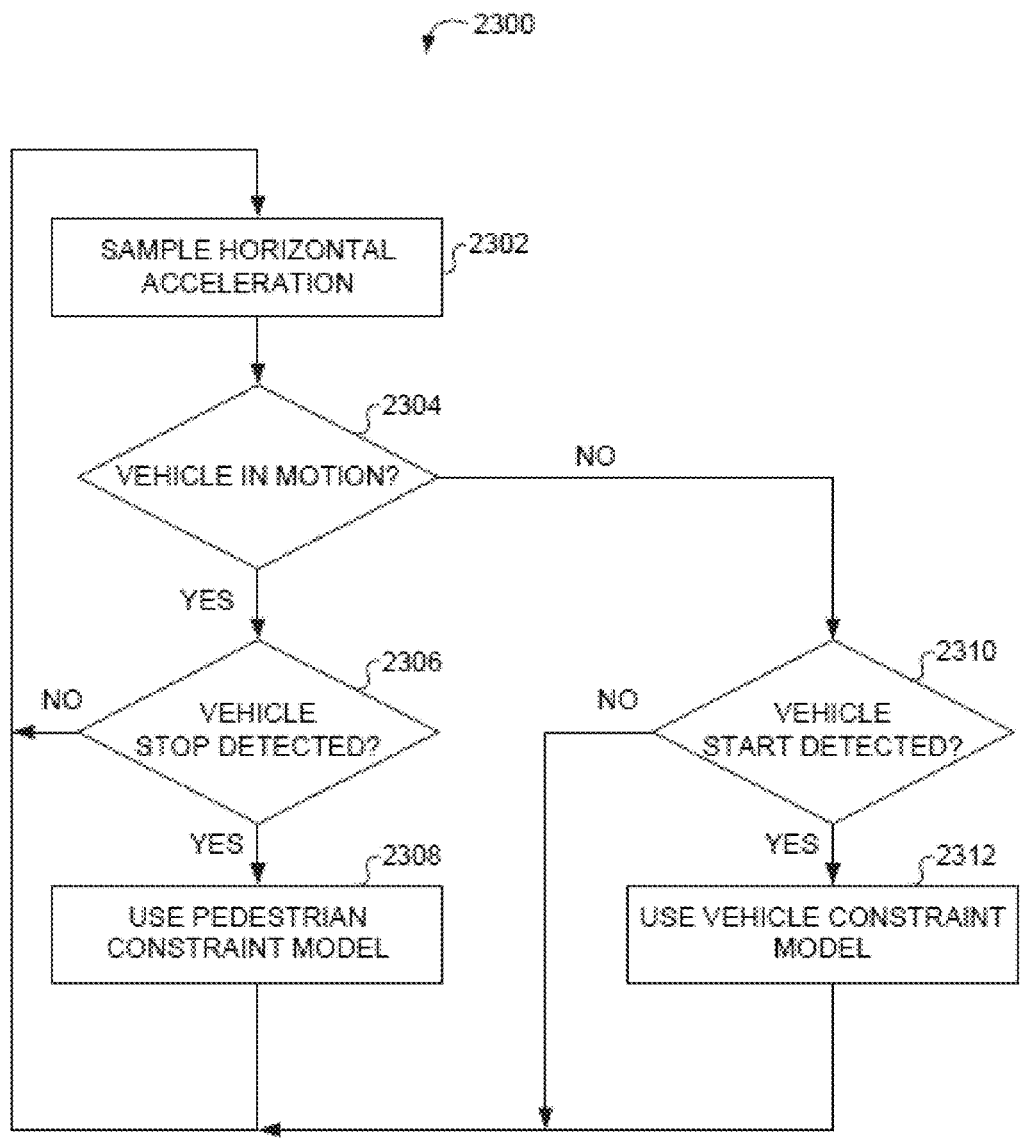
FIG. 23 is an exemplary illustration of various processing operations of a process for determining a transition between travelling in a vehicle and travelling on foot, according to an aspect of the invention.

FIG. 23 is an exemplary illustration of various processing operations of a process 2300 for determining a transition between travelling in a vehicle and travelling on foot, according to an aspect of the invention. The various processing operations depicted in the flowchart of FIG. 23 are described in greater detail herein. The described operations may be accomplished using some or all of the system components described in detail above. For example, vehicle transition detection module 330 may be configured to perform some or all of the operations of process 2300.

According to an aspect of the invention, various operations may be performed in different sequences. In other implementations, additional operations may be performed along with some or all of the operations shown in FIG. 23, or some operations may be omitted. In yet other implementations, one or more operations may be performed simultaneously. Accordingly, the operations as illustrated (and described in greater detail below) are exemplary in nature and, as such, should not be viewed as limiting.

Process 2300 may be used to determine whether to use a human constraints model (e.g., when tracking a trackee travelling by foot) or a vehicle constraints model (e.g., when tracking a trackee travelling by vehicle), as well as switching between the two models (e.g., when the tracking switches from travelling by foot and travelling by vehicle and vice versa).

In an operation 2302, horizontal acceleration may be sampled. For example, 3-axis accelerometer sensor information may be sampled at a sampling frequency ($f_s$) of 40 Hz, although other types of inertial sensor information and/or sampling frequencies may be used. In the navigation frame, the accelerometer may be oriented such that the z axis is up, the x axis points to the right of the unit and the y axis points forward. If the device is tilted from this frame, a method of removing tilt may be implemented. Assuming zero (or near zero) non-gravitational acceleration, the accelerometer data can be used to obtain a noisy measurement of pitch and roll relative to the ground frame allowing the user to remove tilt using only accelerometer input. More reliable tilt compensation is possible if information from 3 axis gyros is also available. In this example, the orientation filter described below with respect to orientation filter module 350, which uses both accelerometer and gyro information to provide proper orientation may be used.

In an operation 2304, a determination of whether a vehicle in motion is detected may be made. If the vehicle in motion is detected, a determination of whether a vehicle stop is detected may be made in an operation 2306. If a vehicle stop is detected, a determination that a human constraint model should be used may be made in an operation 2308.

Returning to operation 2304, if a vehicle in motion is not detected, a determination of whether a vehicle start (e.g., vehicle starting motion) may be made in an operation 2310. If a vehicle start is detected, a determination that a vehicle constraints model should be used may be made in an operation 2312.

According to an aspect of the invention, determining whether the vehicle start is detected may include pass $\bar{a}_y$ through a vehicle start detector (which may include or be part of vehicle transition detection module 330). The start detector may include a comparator and a counter. The comparator compares $\bar{a}_y$ with positive threshold acceleration (noise). If $\bar{a}_y$ crosses the threshold, the counter is incremented, otherwise counter is reset to zero. If the counter crosses a predetermined threshold, it indicates start of vehicle (e.g., indicates a vehicle in motion). In this instance, the navigation path may be switched to using a particular type of tracking sensor such as GPS only.

Figure 24:
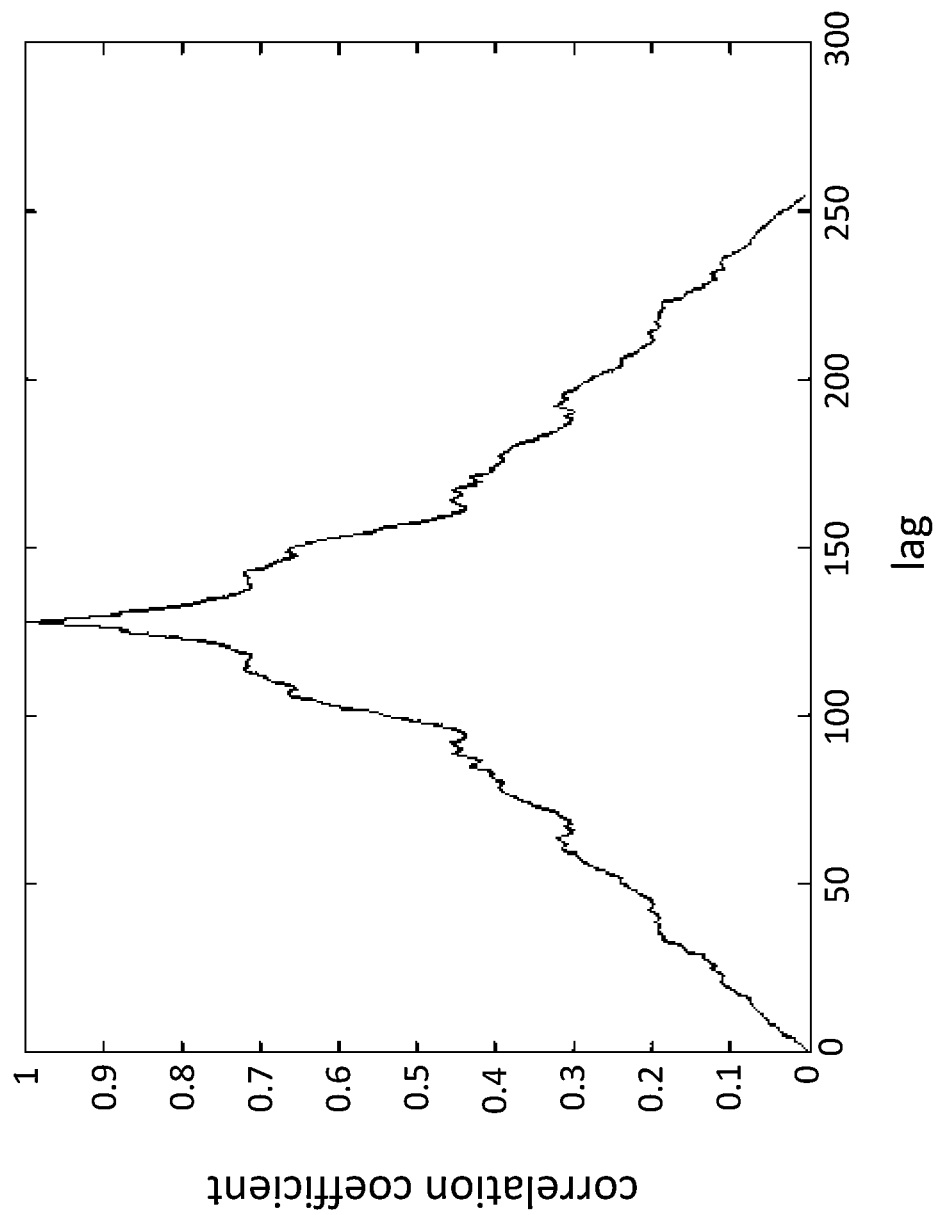
FIGS. 24-25 are exemplary illustrations of the difference in the autocorrelation outputs for car and human motion, according to an aspect of the invention.
Figure 25:
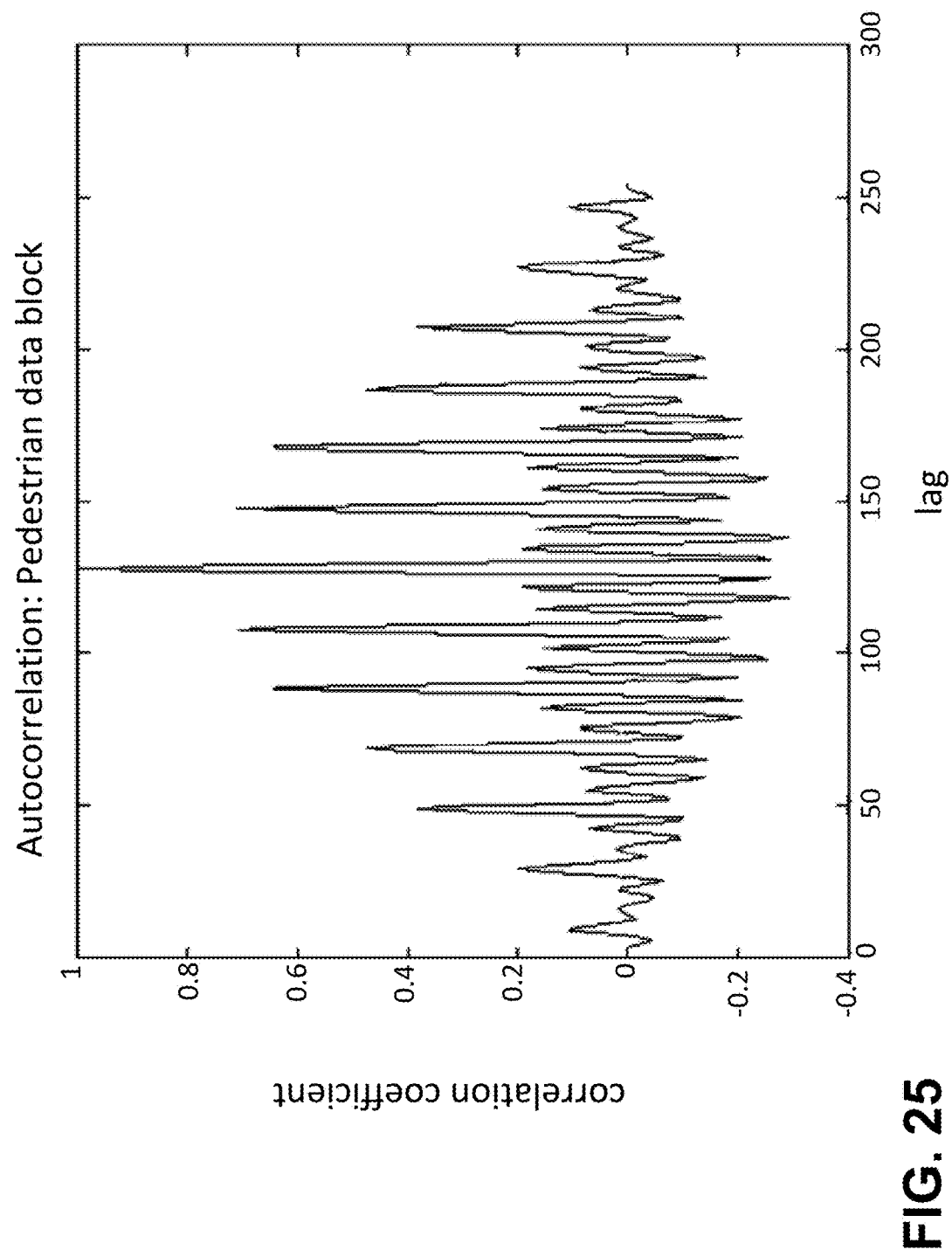

According to an aspect of the invention, determining whether a vehicle stop is detected may include passing $\bar{a}_y$ through a vehicle stop detector (which may include or be part of vehicle transition detection module 330). According to one aspect of the invention, the stop detector may use a certain number of steps (e.g., related to human gait) to be detected within a given period. In another aspect of the invention, the stop detector may perform an autocorrelation on a fixed block of samples. The output of autocorrelation may be feature matched. The autocorrelation output for human gaits (human periodic motion) has a characteristic form with multiple peaks due to the periodicity of human gaits. The peaks are usually evenly spaced and the slight variation would fall within a defined frequency range for human motion. This typical form is not found in vehicle motion or still signal autocorrelation. By matching this typical autocorrelation curve with the successive autocorrelation outputs, the start of human motion may be detected. The start of human motion indicates the stop of vehicular motion and vice versa. At this point, the navigation path may be switched to incorporate inertial path. FIGS. 24 and 25 are exemplary illustrations of the difference in the autocorrelation outputs for car and human motion, according to an aspect of the invention.

Orientation Filter

Many inertial measurement units (IMU) include 3-axis accelerometers and 3-axis gyros. Using knowledge of the gravitational field direction, orientation filter module 350 may be configured to use measurements from the accelerometers to provide drift free redundant estimates of pitch and roll that are accurate when the person is not moving. Gyroscope and accelerometer measurements can be combined to provide a quaternion based orientation estimate.

The gyroscope measurements alone could be sufficient to determine orientation. However, due to sensor imperfection, noise, and bias errors, such estimates can rapidly accumulate error. Fortunately, additional orientation information is available via the accelerometer sensors. Assuming the device is at rest on the earth, it will experience 1 g of acceleration in the direction of the center of the earth. This fact constrains the possible device orientations to a plane that fixes the pitch and roll with respect to the earth frame of reference. Yaw information (earth frame) is not available because yawing the device will not change the direction of its gravity vector. Yaw information is able to be corrected using compass when good compass data is available.

Figure 26:
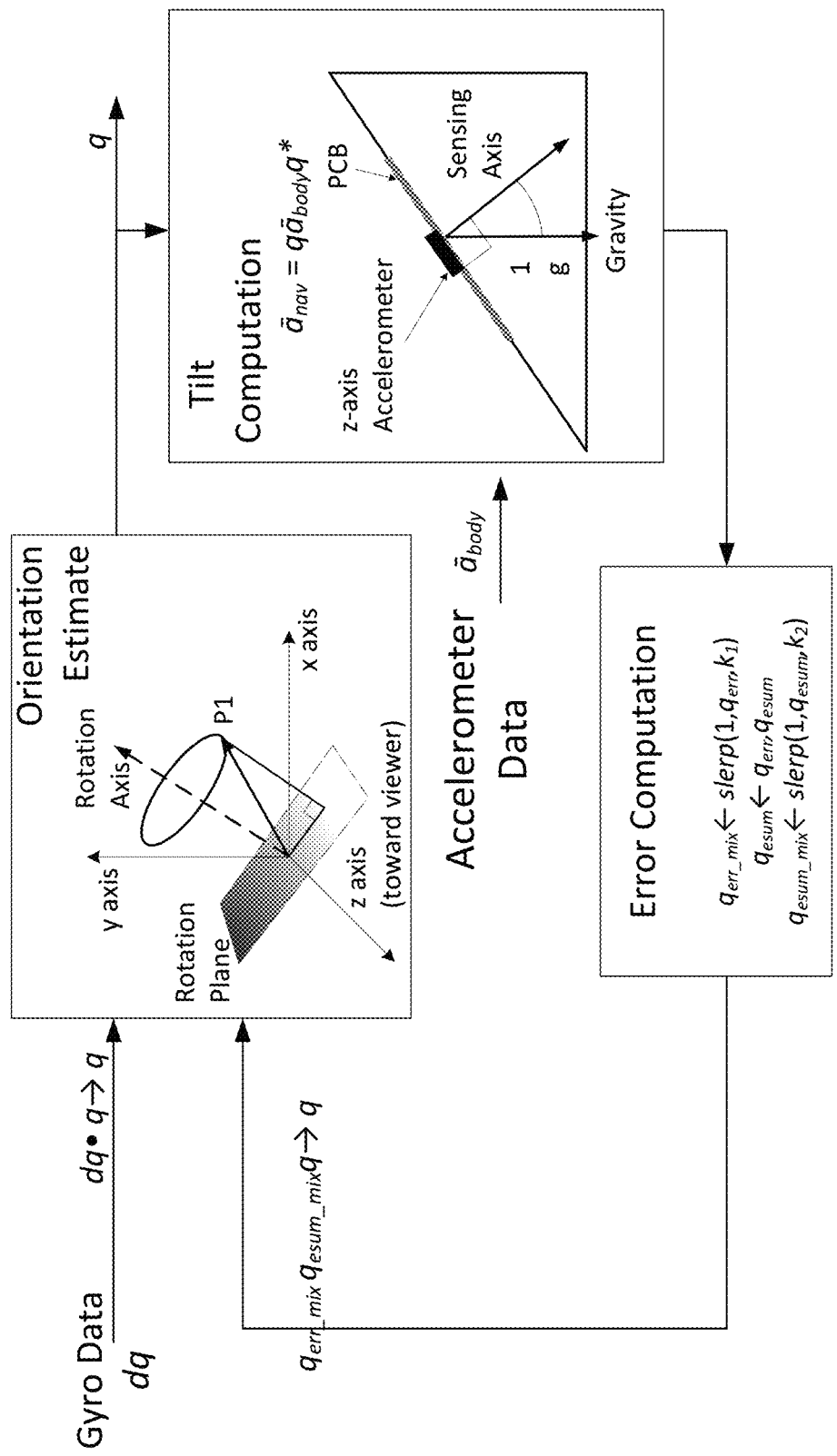
FIG. 26 is an exemplary illustration of mathematically representing orientation estimates as a quaternion, according to an aspect of the invention.

FIG. 26 is an exemplary illustration of mathematically representing orientation estimates as a quaternion (a 4 dimensional vector of real numbers), according to an aspect of the invention. According to an aspect of the invention, the quaternion representation is used to avoid the singularities in the Euler angle parameterization when pitch approaches±90°. Orientation estimates may be based on angular rate from the gyros and a tilt estimate based on the estimation of the direction of gravity using the accelerometers. This gyro estimate is good over the short term but may suffer from bias and saturation errors that cannot be compensated without additional information. Assuming zero (or near zero) non-gravitational acceleration, the accelerometer data can be used to obtain a noisy measurement of pitch and roll relative to the ground frame. The two estimates may be combined in a way that mitigates their inherent drawbacks.

The foregoing gyro and accelerometer estimates may be formulated as quaternion estimates and the fusion of the estimates is accomplished via a Spherical Linear IntERPolation ("SLERP"). The fusion may be performed assuming the gyro computed yaw is correct. By combining the two estimates the best properties of both measurements may be leveraged by the system. The combined measurement eliminates the unmitigated errors in pitch and roll while smoothing the noisy accelerometer measurement.

This SLERP combination is formulated in terms of a proportional feedback control loop. The benefit of the feedback formulation is that conventional methods of feedback control can be easily applied. The accelerometer vector may be used to generate an "error quaternion" and an "error sum quaternion" that are fed back into the orientation estimate update by the gyro measurements. In this sense, the implementation is analogous to a conventional PI (proportional-integral) controller, except that the proportional and integral terms are quaternions instead of scalars or vectors. The effect of the control is that even if the gyroscopes saturate momentarily because the tracking system has experienced a violent motion the IMU's attitude estimate will be rapidly corrected.

The filter's state consists of three variables:
the orientation estimate q,
the "error quaternion" $q_{err}$, and
the "error sum quaternion" $q_{esum}$.

The filter has two parameters:
$k_1$, which is analogous to the proportional term "gain," and
$k_2$, which corresponds to the integral term "gain."

Localization and Mapping

Figure 27A:
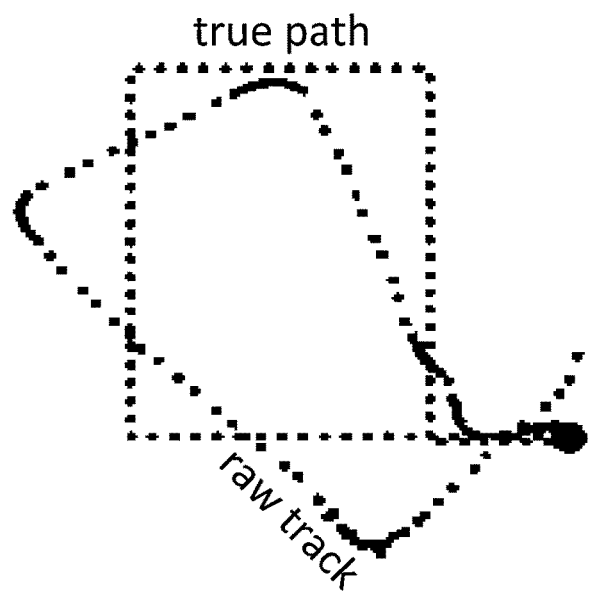
FIG. 27A is an exemplary illustration of the effect of uncompensated gyro bias on a path estimate, according to an aspect of the invention.

Using inertial sensor information for localization may be prone to drift. For example, FIG. 27A illustrates the effect of uncompensated gyro bias on a path estimate, according to an aspect of the invention. The methods presented here for map feature detection from body worn tracking sensors are applicable to improving navigation using various devices, such as cell phones, that include sensors.

According to an aspect of the invention, localization and mapping module 360 may use the sensor features, structural features, and/or transitions described herein to perform error reduction for allowing reasonable duration of tracking in GPS denied areas such as indoors.

Figure 12B:
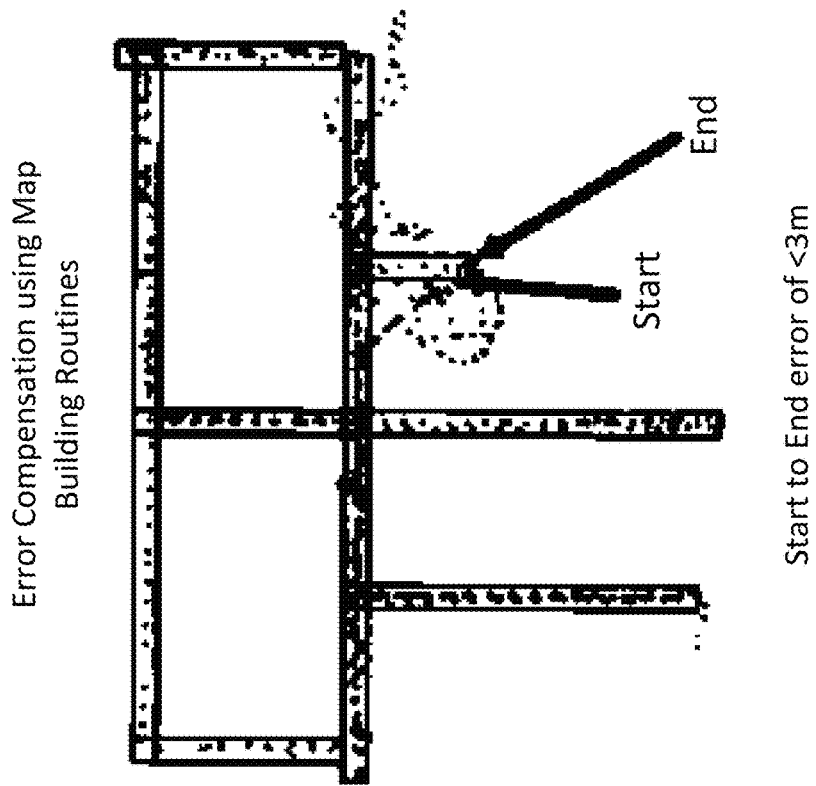
FIG. 12B is an exemplary illustration of a generated map and compensated inertial path, according to an aspect of the invention.
Figure 12A:
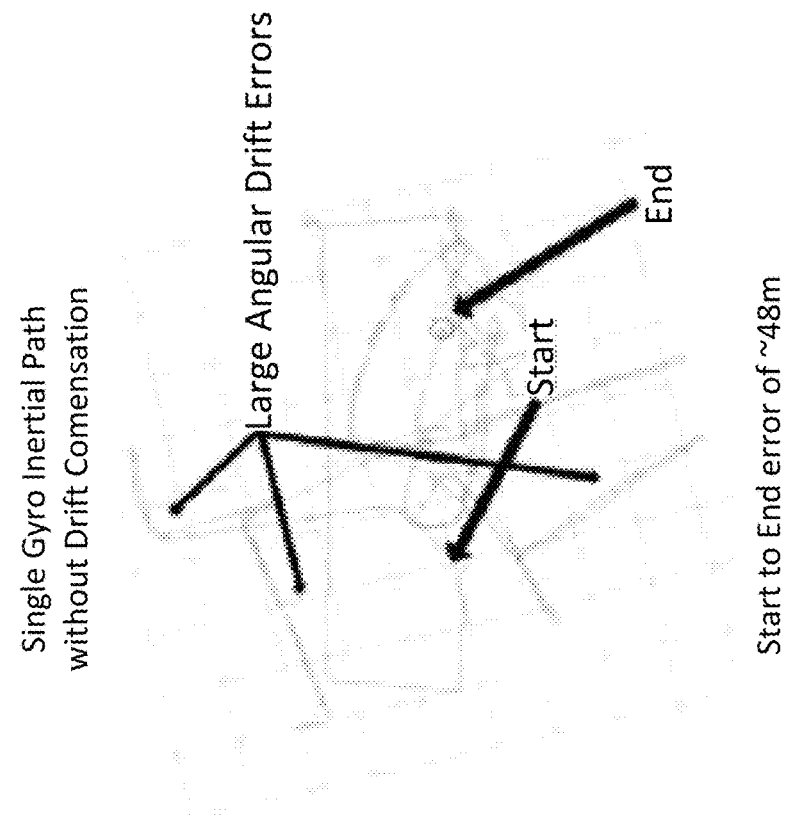
FIG. 12A is an exemplary illustration of an uncompensated inertial path, according to an aspect of the invention.

For example, in one 25 minute long test, the error from pure inertial based location estimate was reduced from 48 meters (as illustrated in FIG. 12A) to less than 3 meters (as illustrated in FIG. 12B) using the mapped-based constraint algorithms.

According to an aspect of the invention, localization and mapping module 360 may be configured to localize a trackee at a location and generate a map of the location based on inertial sensor information from one or more tracking systems 110. Localization and mapping module 360 may implement SLAM algorithms using inertial sensor information. The inertial sensor information may be received directly from tracking system 110 (e.g., in a streaming implementation) and/or via files (e.g., in a batched or stored implementation). Because position estimates and measurements are imperfect, localization and mapping module 360 may update the uncertain geometric or topological environment model based on new observations that maintained consistent interpretation of relations between all of the uncertain features. Due to the common error in estimated observer location between landmarks, there should be a high degree of correlation between estimates of the location of different landmarks in a map. In fact, these correlations may grow with successive observations of the landmarks. Practically, this means that the relative location between any two landmarks may be known with high accuracy, even when the absolute location of a specific landmark is quite uncertain. The combined mapping and localization problem, once formulated as a single estimation problem, may be convergent—that is, the estimated map converges monotonically to a relative map with zero or near zero uncertainty. Additionally, the absolute accuracy of the map and subject location reaches a lower bound defined by the uncertainty in the initialization. The correlations between landmarks are an important part of the problem and stronger correlations result in better solutions. There are many references discussing detailed implementation of SLAM algorithms. The inertial and/or other features described herein could be used as input to any such algorithm.

The SLAM problem can be broken into two pieces: the observation model and the motion model. The observation model (or sensor model) $p(z_t|x_t)$ describes the probability of making an observation $z_t$ of selected landmarks when the observer location and landmark locations are known. In SLAM, the system state $x_t$ includes the observer pose as well as the map. When the observer location and map are defined, observations are conditionally independent given the map and the current observer state.

The motion model $p(x_t|u_t, x_{t-1})$ for the observer is assumed to be a Markov process in which the next state depends only on the immediately preceding state $x_{t-1}$ and the applied control $u_t$ (which may be unknown as is the case in personnel tracking) and is independent of both the observations and the map. Localization and mapping module 360 may then apply a Bayes filter based on the following:

Time Update: prediction of the state given the previous state and the control input using the equation:

$$p(x_t|z_{1:t-1},u_{1:t}) = \int p(x_t|u_t,x_{t-1})p(x_{t-1}|z_{1:t-1},u_{1:t-1})dx_{t-1} \quad (8)$$

wherein:

a state space model of the system is assume where $z_t$ is an observation of selected landmarks, $x_t$ is the system state, and $u_t$ is the control input (which may be unknown as is the case in personnel tracking)

Measurement Update: update of the predicted value given the most recent sensor information using the equation:

$$p(x_t|z_{1:t},u_{1:t}) = \eta p(z_t|x_t)p(x_t|z_{1:t-1},u_{1:t}) \quad (9)$$

wherein:

η represents a normalization constant.

The derivation of this and similarly all the popular recursive state estimation filters rely on the Markov assumption, which postulates that past and future data are independent given the current state. The Bayes filter is not practically implementable at this level of abstraction. Approximations are often made to control computational complexity, e.g. linearity of the state dynamics, Gaussian noise, etc. The resulting un-modeled dynamics or other model inaccuracies can induce violations of this assumption. In practice, the filters are surprisingly robust to such violations.

In probabilistic form, the SLAM problem may require that the probability distribution joint posterior density of the landmark locations and tracked subject's state (at time t), given the recorded observations and control inputs up to and including time t together with the initial state of the tracked subject, be computed for some or all times t. Solutions to the probabilistic SLAM problem involve finding an appropriate representation for both the observation model and the motion model, which may be recursive, that allows efficient and consistent computation of the prior and posterior distributions.

Figure 27B:
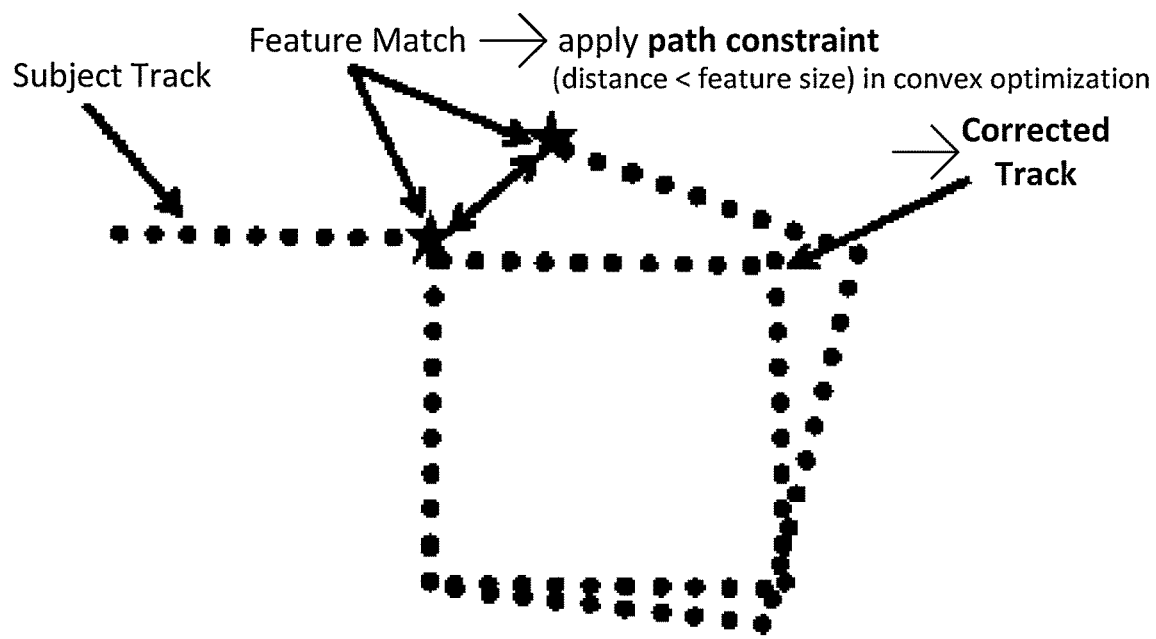
FIG. 27B is an exemplary illustration of processing operations for constraint based simultaneous localization and mapping, according to an aspect of the invention.

As illustrated in FIG. 27B, the SLAM problem can be formulated as a constraint based optimization problem where the feature locations place distance constraints on the path solution when a subject revisits a known feature. In this implementation, the problem is formulated as a convex optimization problem. The feature distance constraints are iteratively enforced while minimizing the change in path length and path shape using distance and angle constraints, respectively. The general approach in convex optimization is to define a convex objective function and to minimize the function while enforcing the associated constraints on the function variables. Convex optimization is appealing because efficient methods may be used to solve for the variables and the solution it yields is optimal with respect to the chosen objective function.

GUI module 370 may generate and provide an interface for, among other things, providing graphical displays of position (or tracking) estimates of personnel and/or assets (including, but not limited to, estimates based on INU, GPS, or fused sensor information) on maps (or other displays) of various kinds including those generated based on collected trajectory data. The GUI may further display identification and status information of personnel and/or assets as determined by sensors connected to the CSM, including the INU. In this regard, a user of computer 120 (e.g., an incident commander at an emergency scene) can monitor, among other things, the location and status information of personnel and/or assets that have been outfitted with a tracking system. As such, in one exemplary application of the invention, a First Responder Safety Communications Network is created that links all emergency personnel and/or assets outfitted with tracking systems with one or more Incident Commanders.

The interface provided by GUI module 370 may provide, and a user may select to view, for example, a trackee's current position estimate (displayed in real-time), some or all of a trackee's path (or trajectory) as it is generated in real-time (e.g., by displaying some or all of the position estimates generated for the trackee based on tracking data acquired for the trackee during a current tracking session), various position estimates that have been generated (during later processing) based on previously acquired tracking data for a trackee, and/or previous paths (or segments thereof) of a trackee based on previously acquired tracking data for a trackee.

In those instances when an image (or other display) of a trackee's current location or environment may be unavailable, position estimates may be displayed on a map as it is being created using map building methods described in detail herein.

According to an aspect of the invention, if multiple trackees are being monitored, the position estimates (and/or tracks) of each trackee may be identified by a unique visual indicator (e.g., color, shape, etc.) to facilitate the process of differentiating one trackee from another. According to an aspect of the invention, a trackee's associated visual indicator may differ depending on whether the trackee is indoors or outdoors. For example, a trackee may be depicted on the interface provided by GUI module 370 as a blue circle while indoors, and a blue square while outdoors. Other variations may be implemented.

According to an aspect of the invention, users may access one or more of the features and functionality of mapping application 130 via the aforementioned GUI. Various views (or "screen shots" or "displays") that a user may encounter while using mapping application 130 are illustrated in one or more of the accompanying drawing figures, which are exemplary in nature. These views should therefore not be viewed as limiting. Additionally, user input may occur via any input device associated with computer 120 including, but not limited to, a keyboard, computer mouse, light stylus instrument, a finger in a touch-screen implementation, or other device. While user inputs may be referred to herein as occurring via "clicking," for example, such descriptions are exemplary in nature and should not be viewed as limiting.

Other aspects, uses and advantages of the invention will be apparent to those skilled in the art from consideration of the specification and practice of the invention disclosed herein. The specification should be considered exemplary only.

What is claimed:

1. A computer-implemented method of localizing a trackee at a location and generating or updating a map of the location based on sensor information, the method being implemented on a computer system that includes one or more physical processors programmed by one or more modules, the method comprising:
   identifying, by a feature detection module, at least one sensor feature based on a combination of: inertial sensor data, magnetic data, radiation data, and signal strength data, wherein the at least one sensor feature includes a plurality of measurements that measure a motion of the trackee at the location and being identified based on a first subset of the plurality of measurements;
   utilizing the at least one sensor feature, that includes a plurality of measurements that measure a motion of the trackee at the location, to identify a landmark at the location;
   determining, by a localization and mapping module, a location estimate that estimates the location of the trackee based on at least a second subset of the plurality of measurements that is the same as or different from the first subset of the plurality of measurements, wherein a landmark position of the landmark is determined based on the location estimate;
   generating a feature message that includes information unique to the landmark and the landmark position on a path of the trackee;
   generating or updating the map based on the feature message.

2. The computer-implemented method of claim 1, wherein the at least one sensor feature includes vector representations of one or more of magnetic data, radiation data, inertial data, and signal strength data.

3. The computer-implemented method of claim 1, wherein the landmark is identified by a feature descriptor detailing unique aspects of the landmark based on high sample rate data.

4. The computer-implemented method of claim 1, wherein the magnetic data includes an extrema or a sharp transition in magnetic magnitude.

5. The computer-implemented method of claim 1, wherein the magnetic data includes a minimum magnitude and a maximum magnitude.

6. The computer-implemented method of claim 1, wherein the landmark is not identified until the at least one sensor feature has been identified at the landmark position multiple times.

7. The computer-implemented method of claim 1, wherein the identification of the at least one sensor feature is further based on second sensor information.

8. The computer-implemented method of claim 7, wherein the second sensor information includes one or more of magnetic data, radiation data, inertial data, signal strength data, global positioning data, and light data.

9. The computer-implemented method of claim 1, wherein identifying the landmark includes correlating the at least one sensor feature to a structural feature.

10. The computer-implemented method of claim 1, wherein the information unique to the landmark includes a description comprising parameters of structural features of the landmark.

11. The computer-implemented method of claim 1, wherein generating or updating the map includes generating or updating the map based on the landmark position.

12. The computer-implemented method of claim 1, wherein the at least one sensor feature is detected from a tracking device carried, worn, or otherwise associated with the trackee.

13. A computer-implemented method being implemented on a computer system that includes one or more physical processors programmed by one or more modules, the method comprising:
   identifying, by a first module, a sensor feature based on a combination of: inertial sensor data, magnetic data, radiation data, and signal strength data, wherein the sensor feature includes a plurality of measurements representing a motion of a trackee at a location and being identified based on a first subset of the plurality of measurements;
   correlating the sensor feature, that includes a plurality of measurements that measure a motion of the trackee at the location, to identify a landmark;
   determining, by a second module, a location estimate that estimates the location of the trackee based on at least a second subset of the plurality of measurements that is the same as or different from the first subset of the plurality of measurements, wherein a landmark position of the landmark is determined based on the location estimate;
   generating, by a third module, a feature message that includes information unique to the landmark and the landmark position on a path of the trackee;
   generating or updating, by a fourth module, the map based on the feature message.

14. The computer-implemented method of claim 13, wherein the sensor feature includes vector representations of one or more of magnetic data, radiation data, inertial data, and signal strength data.

15. The computer-implemented method of claim 13, wherein the landmark is identified by a feature descriptor detailing unique aspects of the landmark based on high sample rate data.

16. The computer-implemented method of claim 13, wherein the magnetic data includes an extrema or a sharp transition in magnetic magnitude.

17. The computer-implemented method of claim 13, wherein the magnetic data includes a minimum magnitude and a maximum magnitude.

18. The computer-implemented method of claim 13, wherein the identification of the sensor feature is further based on second sensor information.

19. The computer-implemented method of claim 18, wherein the second sensor information includes one or more of magnetic data, radiation data, inertial data, signal strength data, global positioning data, and light data.

20. The computer-implemented method of claim 13, wherein the information unique to the landmark includes a description comprising parameters of structural features of the landmark.

21. The computer-implemented method of claim 13, wherein generating or updating the map includes generating or updating the map based on the landmark position.

22. The computer-implemented method of claim 13, wherein the sensor feature is detected from a tracking device carried, worn, or otherwise associated with the trackee.

* * * * *